United States Patent
Kwak et al.

(10) Patent No.: US 12,457,617 B2
(45) Date of Patent: Oct. 28, 2025

(54) SYSTEM INFORMATION TRANSMISSION WITH COVERAGE RECOVERY

(71) Applicant: QUALCOMM Incorporated, San Diego, CA (US)

(72) Inventors: Yongjun Kwak, San Diego, CA (US); Prashant Sharma, San Jose, CA (US); Hung Dinh Ly, San Diego, CA (US); Muhammad Nazmul Islam, Littleton, MA (US); Yuchul Kim, San Diego, CA (US); Linhai He, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 499 days.

(21) Appl. No.: 17/956,735

(22) Filed: Sep. 29, 2022

(65) Prior Publication Data

US 2024/0114518 A1    Apr. 4, 2024

(51) Int. Cl.
*H04W 72/23*    (2023.01)
*H04W 72/044*   (2023.01)
*H04W 72/1263*  (2023.01)

(52) U.S. Cl.
CPC ......... *H04W 72/23* (2023.01); *H04W 72/044* (2013.01); *H04W 72/1263* (2013.01)

(58) Field of Classification Search
CPC ............... H04W 72/23; H04W 72/044; H04W 72/1263; H04W 48/12
See application file for complete search history.

(56) References Cited

U.S. PATENT DOCUMENTS

| | | | |
|---|---|---|---|
| 10,833,826 B2 * | 11/2020 | Lei | H04W 56/0015 |
| 11,528,743 B2 * | 12/2022 | Agiwal | H04W 76/19 |
| 12,150,163 B2 * | 11/2024 | Chae | H04W 72/0453 |
| 2016/0270038 A1 * | 9/2016 | Papasakellariou | H04L 1/1896 |
| 2017/0201989 A1 * | 7/2017 | Fakoorian | H04L 5/0046 |
| 2018/0109995 A1 * | 4/2018 | Akkarakaran | H04W 74/004 |
| 2019/0387532 A1 * | 12/2019 | Liu | H04L 5/0012 |
| 2020/0106559 A1 * | 4/2020 | Vilaipornsawai | H04L 1/1896 |

(Continued)

FOREIGN PATENT DOCUMENTS

| | | | | |
|---|---|---|---|---|
| CA | 3212949 A1 * | 9/2022 | | H04L 5/0032 |
| CN | 117813782 A * | 4/2024 | | H04L 1/0013 |

(Continued)

*Primary Examiner* — Sujoy K Kundu
*Assistant Examiner* — Vladislav Y Agureyev
(74) *Attorney, Agent, or Firm* — Guang Y. Zhang; Holland & Hart LLP

(57) ABSTRACT

Methods, systems, and devices for wireless communication are described. A user equipment (UE) may receive a grant scheduling repetition-based system information block transmissions for the UE, the grant indicating a mapping configuration identifying time-frequency resources for a second repetition of a system information block transmission relative to a first repetition of the system information block transmission. The UE may receive, in a first subset bandwidth of a system bandwidth, the first repetition of the system information block transmission according to the grant. The UE may receive, in a second subset bandwidth of the system bandwidth, the second repetition of the system information block transmission according to the grant and based at least in part on the mapping configuration.

24 Claims, 17 Drawing Sheets

(56) References Cited

U.S. PATENT DOCUMENTS

| | | | |
|---|---|---|---|
| 2020/0260485 A1* | 8/2020 | Lei | H04W 72/23 |
| 2021/0044385 A1* | 2/2021 | Hosseini | H04L 1/08 |
| 2021/0051707 A1* | 2/2021 | Rastegardoost | H04L 5/10 |
| 2021/0051729 A1* | 2/2021 | Lei | H04W 74/0833 |
| 2021/0067270 A1* | 3/2021 | Sui | H04L 5/0091 |
| 2021/0127396 A1* | 4/2021 | Su | H04W 72/1263 |
| 2021/0212108 A1* | 7/2021 | Lou | H04L 1/189 |
| 2021/0360616 A1* | 11/2021 | Yi | H04W 72/21 |
| 2021/0360660 A1* | 11/2021 | Cozzo | H04L 1/1887 |
| 2022/0191899 A1* | 6/2022 | Hwang | H04L 1/08 |
| 2022/0210802 A1* | 6/2022 | Hwang | H04L 5/0053 |
| 2022/0287103 A1* | 9/2022 | Cozzo | H04W 74/002 |
| 2022/0322447 A1* | 10/2022 | Fakoorian | H04L 1/001 |
| 2023/0073219 A1* | 3/2023 | Babaei | H04L 1/1819 |
| 2023/0156850 A1* | 5/2023 | Cirik | H04W 72/1268 370/329 |
| 2023/0164781 A1* | 5/2023 | Kim | H04W 48/12 370/329 |
| 2023/0284230 A1* | 9/2023 | Cirik | H04L 5/0048 370/328 |
| 2023/0328706 A1* | 10/2023 | Cozzo | H04L 1/189 |
| 2024/0015732 A1* | 1/2024 | Muruganathan | H04W 72/1268 |
| 2024/0049288 A1* | 2/2024 | Fakoorian | H04W 72/232 |
| 2024/0155607 A1* | 5/2024 | Han | H04L 1/1893 |
| 2024/0171251 A1* | 5/2024 | Lee | H04W 72/23 |
| 2024/0224303 A1* | 7/2024 | Guo | H04W 72/563 |

FOREIGN PATENT DOCUMENTS

| | | | | |
|---|---|---|---|---|
| EP | 3609238 A1 * | 2/2020 | | H04L 5/00 |
| EP | 3923664 A1 * | 12/2021 | | H04L 1/08 |
| WO | WO-2019066694 A1 * | 4/2019 | | H04L 1/08 |
| WO | WO-2022031221 A1 * | 2/2022 | | H04B 7/024 |

\* cited by examiner

SYSTEM INFORMATION TRANSMISSION WITH COVERAGE RECOVERY

FIELD OF TECHNOLOGY

The following relates to wireless communication, including system information transmission with coverage recovery.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support system information transmission with coverage recovery. For example, the described techniques provide for a user equipment (UE) to receive a grant scheduling repetition-based system information (e.g., system information block (SIB)) transmissions for the UE. The grant may carry or indicate a mapping configuration that identifies time-frequency resources for a second repetition of the SIB transmission relative to the first repetition of the SIB transmission. That is, in some aspects a single downlink control information (DCI) may be used to schedule multiple repetitions of the SIB transmissions. The DCI may schedule the first repetition of the SIB transmission (e.g., may identify the time-frequency resources to be used for receiving the first repetition). The DCI may also indicate a mapping configuration that maps the time-frequency resources to be used for the second repetition relative to the first repetition. For example, the mapping configuration may use a cyclic-shifted virtual resource block-to-physical resource block (VRB-to-PRB) mapping (e.g., an interleaving mapping) for the second repetition relative to the first repetition. In some examples, the redundancy version (RV) carried or otherwise indicated in the grant may indicate the time-frequency resources for the second repetition relative to the first repetition. In some examples, the second repetition is transmitted in the same bandwidth or in a different bandwidth than the first repetition of the SIB transmission (e.g., UE retuning may be performed in some examples). Accordingly, the UE may use the time-frequency resources of the first repetition and the mapping configuration to identify the time-frequency resource in which the second repetition of the SIB transmission will be received in.

In some examples, separate DCIs may be used when scheduling the repetition-based SIB transmissions. Accordingly, aspects of the techniques may include scheduling constraints imposed on the scheduling grants. That is, the scheduling constraints imposed for grants scheduling different repetitions of the SIB transmission may maintain certain parameters between the SIB transmission repetitions. For example, the scheduling constraints may include the network entity using the same modulation coding scheme (MCS), frequency domain resource allocation (FDRA), VRB-to-PRB mapping, RV, etc., between the grants. Accordingly, the UE may receive a first repetition of a SIB transmission scheduled by a first grant and then a second repetition of the SIB transmission scheduled by a second grant. However, the scheduling constraint applied to the first and second grants may provide an improved mechanism for the UE to receive the second repetition of the SIB transmissions based on the shared parameters (e.g., MCS, FDRA, etc.) between the first and second grants.

A method for wireless communication at a UE is described. The method may include receiving a grant scheduling repetition-based SIB transmissions for the UE, the grant indicating a mapping configuration identifying time-frequency resources for a second repetition of a SIB transmission relative to a first repetition of the SIB transmission, receiving, in a first subset bandwidth of a system bandwidth, the first repetition of the SIB transmission according to the grant, and receiving, in a second subset bandwidth of the system bandwidth, the second repetition of the SIB transmission according to the grant and based on the mapping configuration.

An apparatus for wireless communication at a UE is described. The apparatus may include a processor and memory coupled to the processor and configured to receive a grant scheduling repetition-based SIB transmissions for the UE, the grant indicating a mapping configuration identifying time-frequency resources for a second repetition of a SIB transmission relative to a first repetition of the SIB transmission, receive, in a first subset bandwidth of a system bandwidth, the first repetition of the SIB transmission according to the grant, and receive, in a second subset bandwidth of the system bandwidth, the second repetition of the SIB transmission according to the grant and based on the mapping configuration.

Another apparatus for wireless communication at a UE is described. The apparatus may include means for receiving a grant scheduling repetition-based SIB transmissions for the UE, the grant indicating a mapping configuration identifying time-frequency resources for a second repetition of a SIB transmission relative to a first repetition of the SIB transmission, means for receiving, in a first subset bandwidth of a system bandwidth, the first repetition of the SIB transmission according to the grant, and means for receiving, in a second subset bandwidth of the system bandwidth, the second repetition of the SIB transmission according to the grant and based on the mapping configuration.

A non-transitory computer-readable medium storing code for wireless communication at a UE is described. The code may include instructions executable by a processor to receive a grant scheduling repetition-based SIB transmissions for the UE, the grant indicating a mapping configuration identifying time-frequency resources for a second repetition of a SIB transmission relative to a first repetition of the SIB transmission, receive, in a first subset bandwidth of a system bandwidth, the first repetition of the SIB transmission according to the grant, and receive, in a second subset bandwidth of the system bandwidth, the second repetition of the SIB transmission according to the grant and based on the mapping configuration.

Some examples of the method, apparatuses, and non-transitory computer-readable medium described herein may further include operations, features, means, or instructions for selecting a set of time-frequency resources for the second repetition of the SIB transmission based on an interleaving mapping indicated in the grant, where the mapping configuration includes the interleaving mapping.

Some examples of the method, apparatuses, and non-transitory computer-readable medium described herein may further include operations, features, means, or instructions for detecting, in the grant, a repetition flag set to a value indicating that the second repetition of the SIB transmission will occur and selecting the set of time-frequency resources for the second repetition of the SIB transmission based on the repetition flag and a time domain resource allocation indicated in the grant.

Some examples of the method, apparatuses, and non-transitory computer-readable medium described herein may further include operations, features, means, or instructions for detecting, in the grant, a redundancy version set to a value indicating that the second repetition of the SIB transmission will occur and selecting the set of time-frequency resources for the second repetition of the SIB transmission based on the redundancy version and a time domain resource allocation indicated in the grant.

In some examples of the method, apparatuses, and non-transitory computer-readable medium described herein, the set of time-frequency resources associated with the interleaving mapping includes a cyclic shifting of the system bandwidth, cyclic shifting of one or more resource blocks, or a combination thereof.

Some examples of the method, apparatuses, and non-transitory computer-readable medium described herein may further include operations, features, means, or instructions for determining a synchronization signal block bandwidth based on the system bandwidth, where the first subset bandwidth and the second subset bandwidth may be based on the synchronization signal block bandwidth.

Some examples of the method, apparatuses, and non-transitory computer-readable medium described herein may further include operations, features, means, or instructions for performing a retuning operation to retune from the first subset bandwidth to the second subset bandwidth between receiving the first repetition and the second repetition of the SIB transmission, where the second subset bandwidth includes a different bandwidth relative to the first subset bandwidth.

Some examples of the method, apparatuses, and non-transitory computer-readable medium described herein may further include operations, features, means, or instructions for refraining from performing a retuning operation to retune from the first subset bandwidth to the second subset bandwidth between receiving the first repetition and the second repetition of the SIB transmission, where the second subset bandwidth includes a same bandwidth relative to the first subset bandwidth.

A method for wireless communication at a UE is described. The method may include receiving a first repetition of a SIB transmission according to a first grant scheduling the first repetition and receiving a second repetition of the SIB transmission according to a second grant scheduling the second repetition, the receiving based on a scheduling constraint associated with the first grant and the second grant that maintains one or more transmission parameters between the first grant scheduling the first repetition and the second grant scheduling the second repetition of the SIB transmission.

An apparatus for wireless communication at a UE is described. The apparatus may include a processor, memory coupled with the processor, and instructions stored in the memory. The instructions may be executable by the processor to cause the apparatus to receive a first repetition of a SIB transmission according to a first grant scheduling the first repetition and receive a second repetition of the SIB transmission according to a second grant scheduling the second repetition, the receiving based on a scheduling constraint associated with the first grant and the second grant that maintains one or more transmission parameters between the first grant scheduling the first repetition and the second grant scheduling the second repetition of the SIB transmission.

Another apparatus for wireless communication at a UE is described. The apparatus may include means for receiving a first repetition of a SIB transmission according to a first grant scheduling the first repetition and means for receiving a second repetition of the SIB transmission according to a second grant scheduling the second repetition, the receiving based on a scheduling constraint associated with the first grant and the second grant that maintains one or more transmission parameters between the first grant scheduling the first repetition and the second grant scheduling the second repetition of the SIB transmission.

A non-transitory computer-readable medium storing code for wireless communication at a UE is described. The code may include instructions executable by a processor to receive a first repetition of a SIB transmission according to a first grant scheduling the first repetition and receive a second repetition of the SIB transmission according to a second grant scheduling the second repetition, the receiving based on a scheduling constraint associated with the first grant and the second grant that maintains one or more transmission parameters between the first grant scheduling the first repetition and the second grant scheduling the second repetition of the SIB transmission.

Some examples of the method, apparatuses, and non-transitory computer-readable medium described herein may further include operations, features, means, or instructions for receiving the first repetition in a first subset bandwidth of a system bandwidth and receiving the second repetition in a second subset bandwidth of the system bandwidth, where the second subset bandwidth includes a different bandwidth relative to the first subset bandwidth.

Some examples of the method, apparatuses, and non-transitory computer-readable medium described herein may further include operations, features, means, or instructions for receiving the first repetition in a first subset bandwidth of a system bandwidth and receiving the second repetition in a second subset bandwidth of the system bandwidth, where the second subset bandwidth includes a same bandwidth relative to the first subset bandwidth.

Some examples of the method, apparatuses, and non-transitory computer-readable medium described herein may further include operations, features, means, or instructions for selecting a set of time-frequency resources for the second repetition of the SIB transmission based on a redundancy version set to a value indicating that the second repetition of the SIB transmission will occur.

Some examples of the method, apparatuses, and non-transitory computer-readable medium described herein may further include operations, features, means, or instructions for detecting a flag in the first grant set to a value to indicate whether contents of the SIB transmission may be shared between the first repetition and the second repetition.

In some examples of the method, apparatuses, and non-transitory computer-readable medium described herein, the scheduling constraint includes a shared modulation and coding scheme, a shared frequency domain resource allocation, a shared interleaved interleaving mapping, a shared redundancy version, or a combination thereof.

A method for wireless communication at a network entity is described. The method may include transmitting a grant scheduling repetition-based SIB transmissions for a UE, the grant indicating a mapping configuration identifying time-frequency resources for a second repetition of a SIB transmission relative to a first repetition of the SIB transmission, transmitting, in a first subset bandwidth of a system bandwidth, the first repetition of the SIB transmission according to the grant, and transmitting, in a second subset bandwidth of the system bandwidth, the second repetition of the SIB transmission according to the grant and based on the mapping configuration.

An apparatus for wireless communication at a network entity is described. The apparatus may include a processor, memory coupled with the processor, and instructions stored in the memory. The instructions may be executable by the processor to cause the apparatus to transmit a grant scheduling repetition-based SIB transmissions for a UE, the grant indicating a mapping configuration identifying time-frequency resources for a second repetition of a SIB transmission relative to a first repetition of the SIB transmission, transmit, in a first subset bandwidth of a system bandwidth, the first repetition of the SIB transmission according to the grant, and transmit, in a second subset bandwidth of the system bandwidth, the second repetition of the SIB transmission according to the grant and based on the mapping configuration.

Another apparatus for wireless communication at a network entity is described. The apparatus may include means for transmitting a grant scheduling repetition-based SIB transmissions for a UE, the grant indicating a mapping configuration identifying time-frequency resources for a second repetition of a SIB transmission relative to a first repetition of the SIB transmission, means for transmitting, in a first subset bandwidth of a system bandwidth, the first repetition of the SIB transmission according to the grant, and means for transmitting, in a second subset bandwidth of the system bandwidth, the second repetition of the SIB transmission according to the grant and based on the mapping configuration.

A non-transitory computer-readable medium storing code for wireless communication at a network entity is described. The code may include instructions executable by a processor to transmit a grant scheduling repetition-based SIB transmissions for a UE, the grant indicating a mapping configuration identifying time-frequency resources for a second repetition of a SIB transmission relative to a first repetition of the SIB transmission, transmit, in a first subset bandwidth of a system bandwidth, the first repetition of the SIB transmission according to the grant, and transmit, in a second subset bandwidth of the system bandwidth, the second repetition of the SIB transmission according to the grant and based on the mapping configuration.

Some examples of the method, apparatuses, and non-transitory computer-readable medium described herein may further include operations, features, means, or instructions for selecting a set of time-frequency resources for the second repetition of the SIB transmission based on an interleaving mapping indicated in the grant, where the mapping configuration includes the interleaving mapping.

Some examples of the method, apparatuses, and non-transitory computer-readable medium described herein may further include operations, features, means, or instructions for detecting, in the grant, a repetition flag set to a value indicating that the second repetition of the SIB transmission will occur and selecting the set of time-frequency resources for the second repetition of the SIB transmission based on the repetition flag and a time domain resource allocation indicated in the grant.

In some examples of the method, apparatuses, and non-transitory computer-readable medium described herein, configuring, in the grant, a redundancy version set to a value indicating that the second repetition of the SIB transmission will occur and selecting the set of time-frequency resources for the second repetition of the SIB transmission based on the redundancy version and a time domain resource allocation indicated in the grant.

In some examples of the method, apparatuses, and non-transitory computer-readable medium described herein, the set of time-frequency resources associated with the interleaving mapping includes a cyclic shifting of the system bandwidth, cyclic shifting of one or more resource blocks, or a combination thereof.

Some examples of the method, apparatuses, and non-transitory computer-readable medium described herein may further include operations, features, means, or instructions for determining a synchronization signal block bandwidth based on the system bandwidth, where the first subset bandwidth and the second subset bandwidth may be based on the synchronization signal block bandwidth.

Some examples of the method, apparatuses, and non-transitory computer-readable medium described herein may further include operations, features, means, or instructions for performing a retuning operation to retune from the first subset bandwidth to the second subset bandwidth between transmitting the first repetition and the second repetition of the SIB transmission, where the second subset bandwidth includes a different bandwidth relative to the first subset bandwidth.

Some examples of the method, apparatuses, and non-transitory computer-readable medium described herein may further include operations, features, means, or instructions for refraining from performing a retuning operation to retune from the first subset bandwidth to the second subset bandwidth between transmitting the first repetition and the second repetition of the SIB transmission, where the second subset bandwidth includes a same bandwidth relative to the first subset bandwidth.

A method for wireless communication at a network entity is described. The method may include transmitting a first repetition of a SIB transmission according to a first grant scheduling the first repetition for a UE and transmitting a second repetition of the SIB transmission according to a second grant scheduling the second repetition, the transmitting based on a scheduling constraint associated with the first grant and the second grant that maintains one or more transmission parameters between the first grant scheduling the first repetition and the second grant scheduling the second repetition of the SIB transmission.

An apparatus for wireless communication at a network entity is described. The apparatus may include a processor, memory coupled with the processor, and instructions stored in the memory. The instructions may be executable by the processor to cause the apparatus to transmit a first repetition of a SIB transmission according to a first grant scheduling the first repetition for a UE and transmit a second repetition of the SIB transmission according to a second grant scheduling the second repetition, the transmitting based on a scheduling constraint associated with the first grant and the second grant that maintains one or more transmission parameters between the first grant scheduling the first repetition and the second grant scheduling the second repetition of the SIB transmission.

Another apparatus for wireless communication at a network entity is described. The apparatus may include means for transmitting a first repetition of a SIB transmission according to a first grant scheduling the first repetition for a UE and means for transmitting a second repetition of the SIB transmission according to a second grant scheduling the second repetition, the transmitting based on a scheduling constraint associated with the first grant and the second grant that maintains one or more transmission parameters between the first grant scheduling the first repetition and the second grant scheduling the second repetition of the SIB transmission.

A non-transitory computer-readable medium storing code for wireless communication at a network entity is described. The code may include instructions executable by a processor to transmit a first repetition of a SIB transmission according to a first grant scheduling the first repetition for a UE and transmit a second repetition of the SIB transmission according to a second grant scheduling the second repetition, the transmitting based on a scheduling constraint associated with the first grant and the second grant that maintains one or more transmission parameters between the first grant scheduling the first repetition and the second grant scheduling the second repetition of the SIB transmission.

Some examples of the method, apparatuses, and non-transitory computer-readable medium described herein may further include operations, features, means, or instructions for transmitting the first repetition in a first subset bandwidth of a system bandwidth and transmitting the second repetition in a second subset bandwidth of the system bandwidth, where the second subset bandwidth includes a different bandwidth relative to the first subset bandwidth.

Some examples of the method, apparatuses, and non-transitory computer-readable medium described herein may further include operations, features, means, or instructions for transmitting the first repetition in a first subset bandwidth of a system bandwidth and transmitting the second repetition in a second subset bandwidth of the system bandwidth, where the second subset bandwidth includes a same bandwidth relative to the first subset bandwidth.

Some examples of the method, apparatuses, and non-transitory computer-readable medium described herein may further include operations, features, means, or instructions for selecting a set of time-frequency resources for the second repetition of the SIB transmission based on a redundancy version set to a value indicating that the second repetition of the SIB transmission will occur.

Some examples of the method, apparatuses, and non-transitory computer-readable medium described herein may further include operations, features, means, or instructions for setting a flag in the first grant to a value to indicate whether contents of the SIB transmission may be shared between the first repetition and the second repetition.

In some examples of the method, apparatuses, and non-transitory computer-readable medium described herein, the scheduling constraint includes a shared modulation and coding scheme, a shared frequency domain resource allocation, a shared interleaving mapping, a shared redundancy version, or a combination thereof.

DETAILED DESCRIPTION

Figure 1:
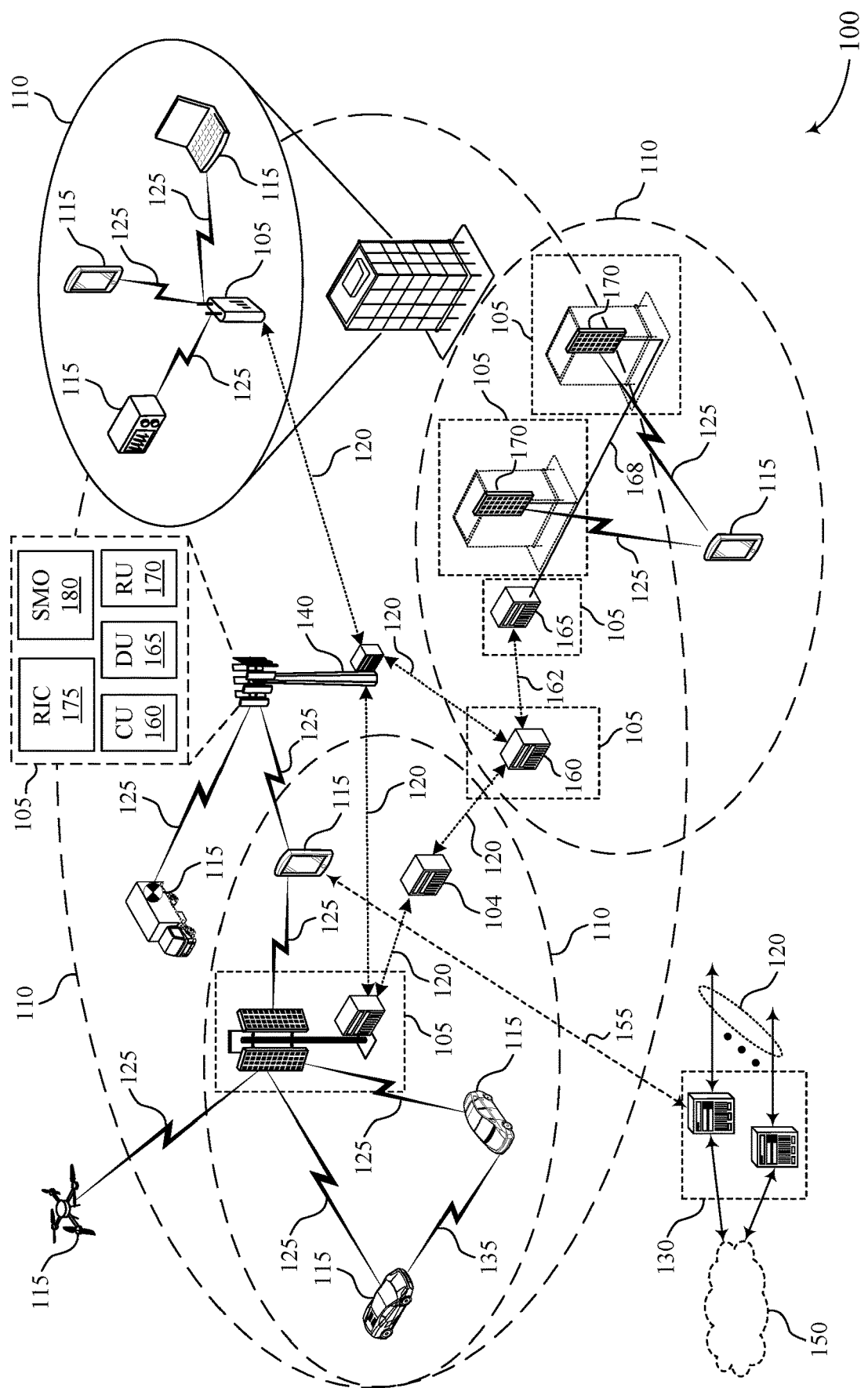
FIG. 1 illustrates an example of a wireless communications system that supports system information transmission with coverage recovery in accordance with one or more aspects of the present disclosure.

Wireless networks may support traditional user equipment (UE), reduced capability UE (RedCap UE) or enhanced RedCap UE (eRedCap UE) performing wireless communications with a network entity or with other UE. To connect to the network entity, the UE (e.g., (e)RedCap UE and non-(e)Redcap UE may monitor for a synchronization signal block (SSB) transmission from the network entity to obtain at least some degree of synchronization information for a target cell. The UE may subsequently obtain cell-specific information for the target cell from a system information block (SIB) transmission (such as a SIB 1 transmission) to establish the connection. The SIB transmission may be scheduled for a UE in a grant (e.g., a downlink control information (DCI) format 1_0 grant) received in a common search space (e.g., in control resource set zero (CORESET 0) scheduling the SIB transmission in a physical downlink shared channel (PDSCH). However, such SIB transmissions are generally based on a system bandwidth (e.g., 20 MHz, 100 MHz, etc., bandwidth) of the wireless network, which may become an issue for a UE operating in a reduced bandwidth (e.g., 5 MHz), such as when the UE is communicating in a PDSCH. To address this scenario, some networks may support SIB repetition where the UE is scheduled for multiple transmissions of the SIB, such as one SIB transmission every 20 ms. However, such techniques generally increase latency and can often by unusable by the UE for combining operations to recover the data payload carried in the SIB transmission (e.g., such as due to changes in the SIB payload between certain boundaries in the time domain).

Accordingly, the described techniques relate to improved methods, systems, devices, and apparatuses that support system information transmission with coverage recovery. For example, the described techniques provide for a UE to receive a grant scheduling repetition-based system information (e.g., SIB) transmissions for the UE. The grant may carry or indicate a mapping configuration that identifies time-frequency resources for a second repetition of the SIB transmission relative to the first repetition of the SIB transmission. That is, in some aspects a single DCI may be used to schedule multiple repetitions of the SIB transmissions. The DCI may schedule the first repetition of the SIB transmission (e.g., may identify the time-frequency resources to be used for receiving the first repetition). The DCI may also indicate a mapping configuration that maps the time-frequency resources to be used for the second repetition relative to the first repetition. For example, the mapping configuration may use a cyclic-shifted virtual resource block-to-physical resource block (VRB-to-PRB) mapping (e.g., an interleaving mapping) for the second repetition relative to the first repetition. In some examples, the redundancy version (RV) carried or otherwise indicated in the grant may indicate the time-frequency resources for the second repetition relative to the first repetition. In some examples, the second repetition is transmitted in the same bandwidth or in a different bandwidth than the first repetition of the SIB transmission (e.g., UE retuning may be performed in some examples). Accordingly, the UE may use the time-frequency resources of the first repetition and the mapping configuration to identify the time-frequency resource in which the second repetition of the SIB transmission will be received in.

In some examples, separate DCIs may be used when scheduling the repetition-based SIB transmissions. Accordingly, aspects of the techniques may include scheduling constraints imposed on the scheduling grants. That is, the scheduling constraints imposed for grants scheduling different repetitions of the SIB transmission may maintain certain parameters between the SIB transmission repetitions. For example, the scheduling constraints may include the network entity using the same modulation coding scheme (MCS), frequency domain resource allocation (FDRA), VRB-to-PRB mapping, RV, etc., between the grants. Accordingly, the UE may receive a first repetition of a SIB transmission scheduled by a first grant and then a second repetition of the SIB transmission scheduled by a second grant. However, the scheduling constraint applied to the first and second grants may provide an improved mechanism for the UE to receive the second repetition of the SIB transmissions based on the shared parameters (e.g., MCS, FDRA, etc.) between the first and second grants.

Aspects of the disclosure are initially described in the context of wireless communications systems. Aspects of the disclosure are further illustrated by and described with reference to apparatus diagrams, system diagrams, and flowcharts that relate to system information transmission with coverage recovery.

FIG. 1 illustrates an example of a wireless communications system 100 that supports system information transmission with coverage recovery in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support system information transmission with coverage recovery as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115).

In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may receive a grant scheduling repetition-based SIB transmissions for the UE 115, the grant indicating a mapping configuration identifying time-frequency resources for a second repetition of a SIB transmission relative to a first repetition of the SIB transmission. The UE 115 may receive, in a first subset bandwidth of a system bandwidth, the first repetition of the SIB transmission according to the grant. The UE 115 may receive, in a second subset bandwidth of the system bandwidth, the second repetition of the SIB transmission according to the grant and based at least in part on the mapping configuration.

A UE 115 may receive a first repetition of a SIB transmission according to a first grant scheduling the first repetition. The UE 115 may receive a second repetition of the SIB transmission according to a second grant scheduling the second repetition, the receiving based at least in part on a scheduling constraint associated with the first grant and the second grant that maintains one or more transmission parameters between the first grant scheduling the first repetition and the second grant scheduling the second repetition of the SIB transmission.

A network entity 105 may transmit a grant scheduling repetition-based SIB transmissions for a UE 115, the grant indicating a mapping configuration identifying time-frequency resources for a second repetition of a SIB transmission relative to a first repetition of the SIB transmission. The network entity 105 may transmit, in a first subset bandwidth of a system bandwidth, the first repetition of the SIB transmission according to the grant. The network entity 105 may transmit, in a second subset bandwidth of the system bandwidth, the second repetition of the SIB transmission according to the grant and based at least in part on the mapping configuration.

A network entity 105 may transmit a first repetition of a SIB transmission according to a first grant scheduling the first repetition for a UE 115. The network entity 105 may transmit a second repetition of the SIB transmission according to a second grant scheduling the second repetition, the transmitting based at least in part on a scheduling constraint associated with the first grant and the second grant that maintains one or more transmission parameters between the first grant scheduling the first repetition and the second grant scheduling the second repetition of the SIB transmission.

Figure 2:
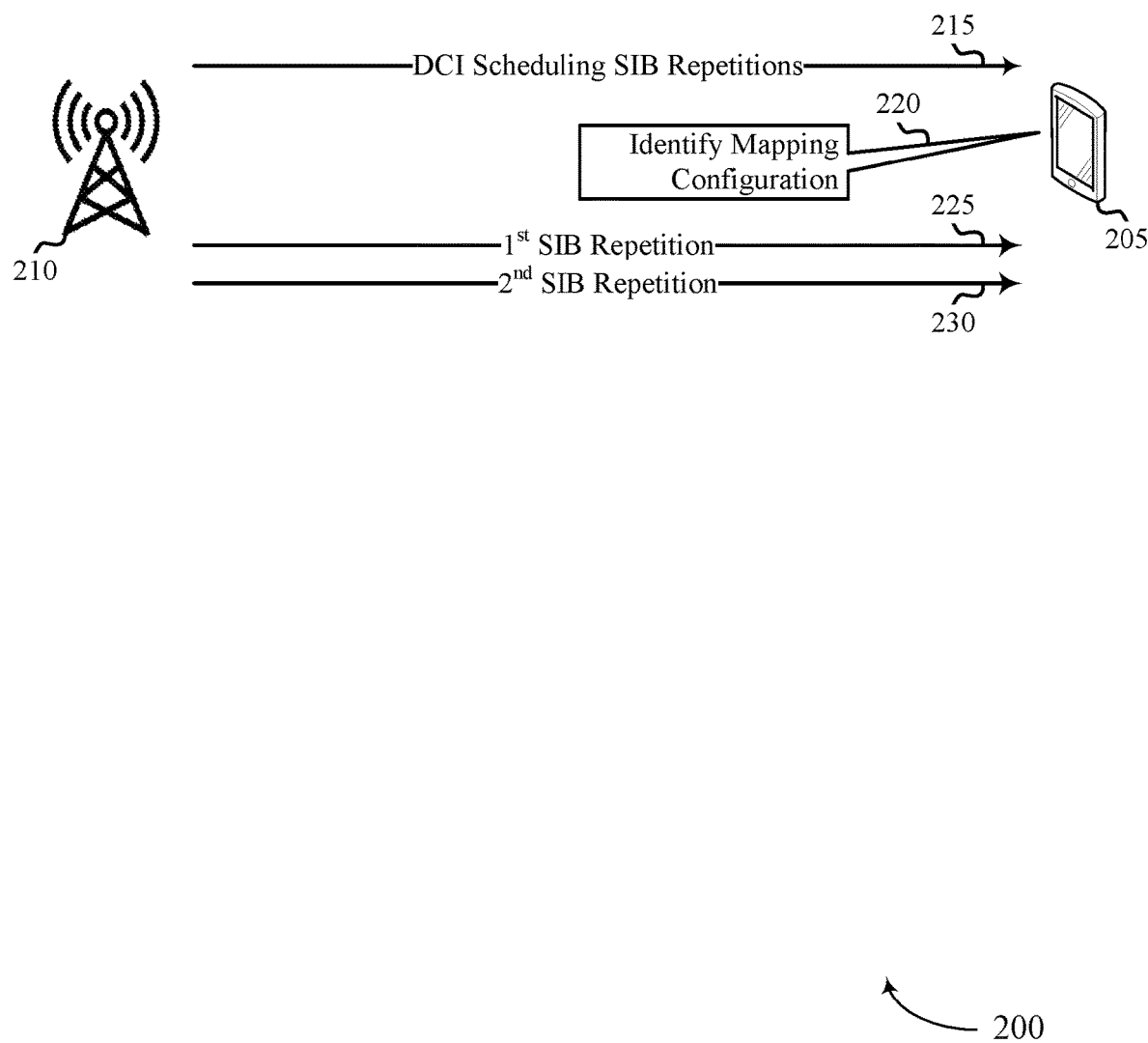
FIG. 2 illustrates an example of a wireless communication system that supports system information transmission with coverage recovery in accordance with one or more aspects of the present disclosure.

FIG. 2 illustrates an example of a wireless communication system 200 that supports system information transmission with coverage recovery in accordance with one or more aspects of the present disclosure. Wireless communication system 200 may implement aspects of wireless communication system 100. Wireless communication system 200 may include UE 205 and network entity 210, which may be examples of the corresponding devices described herein.

Wireless communication system 200 may support various communication types between UE 205 and network entity 210. For example, UE 205 may be configured or otherwise support advanced communication techniques (e.g., eMBB, URLLC, V2X) in some scenarios. Additionally, or alternatively, UE 205 may be configured or otherwise support reduced capabilities (e.g., RedCap UE or eRedCap UE, collectively (e)RedCap UE). Such (e)RedCap UE, which may include a UE type having limited capabilities as well as a traditional or advanced UE type configured to communicate with reduced capabilities). Examples of such reduced or limited communication types may include a reduced throughput level, reduced data rate, small data transfer, and increased latency and reliability requirements. Accordingly, wireless communication system 200 may provide a scalable and deployable network with improved efficiency and cost-effectiveness while supporting communications with advanced or traditional UE types as well as communications with (e)RedCap UE.

One example of such distinctions between UE types may include the operating bandwidth of the UE (e.g., the system bandwidth). For example, some UE may support communications in a 20 MHz system bandwidth, a 100 MHz system bandwidth, or even a wider system bandwidth. However, a (e)RedCap UE may operate in a subset bandwidth that is generally a smaller bandwidth than the system bandwidth. For example, a (e)RedCap UE may operate in a subset bandwidth of 5 MHz in a wireless network otherwise operating in a 20 MHz, 100 MHz, or other system bandwidth. For example, in some networks a (e)RedCap UE may be configured to operate in a subset bandwidth for certain channels (e.g., PDSCH), such as according to a 5 MHz baseband bandwidth while the system bandwidth is still 20 MHz.

Before a UE can communicate with the network, the UE performs cell search and selection procedures to obtain initial system information used to establish the connection with the network. For example, the UE may monitor for primary synchronization signal (PSS), secondary synchronization signal (SSS), and physical broadcast channel (PBCH) information to recover a master information block (MIB). The MIB generally carries or otherwise conveys an indication of resource(s) and parameter(s) necessary for the UE to monitor a search space (SS) (e.g., control resource set (CORESET) 0) in the physical downlink control channel (PDCCH) to recover a grant scheduling additional system information (e.g., RRC configuration information) for the UE. The UE recovers the grant from the default SS/system CORESET and uses the resource(s) and parameter(s) indicated in the grant to recover the SIB to receive the information used for communicating within the wireless network. The bandwidth of the CORESET is generally based on the system bandwidth (e.g., the bandwidth that CORESET 0 is allocated in).

However, this creates a coexistence challenge for different UE types when the (e)RedCap UE operate in a subset bandwidth of the system bandwidth. For example, UE operating in a subset bandwidth (e.g., 5 MHz using 48 PRBs) is generally expected to monitor the system bandwidth of CORESET 0 to detect and receive the grant and subsequently receive the SIB transmissions scheduled by the grant. This may create a coexistence challenge between UE operating in a system bandwidth (e.g., 20 MHz, 100 MHz, or some other system bandwidth configured for CORESET 0) and other UE operating in the subset bandwidth. In some examples, the UE may receive the grant based on the system bandwidth (e.g., monitor and receive PDCCH in the system bandwidth) and then receive or otherwise support operating in the subset bandwidth (e.g., monitor and receive PDSCH in the subset bandwidth). In some examples, a 5 MHz baseband bandwidth may be used by UE for PDSCH (for both unicast and broadcast) and physical uplink shared channel (PUSCH) transmissions with a 20 MHz radio frequency (RF) bandwidth for uplink and downlink. Other physical channels and signals are still allowed to use a BWP up to the 20 MHz maximum (e.g., based on UE RF plus baseband bandwidth).

One approach to resolve such coexistence concerns is to transmit part of a SIB, but this approach reduces coverage significantly. To improve from the coverage loss, SIB repetition may be supported in PDSCH. In some aspects, a SIB transmission (e.g., SIB 1) may include both the PDCCH in CORESET 0 (e.g., the grant scheduling a SIB transmission) as well as the PDSCH of SIB payload. The SIB PDCCH (e.g., the grant) may use 40 bit payload and have a 1% bit level error rate (BLER) target. The SIB PDSCH (e.g., the SIB carried in PDSCH) may use a 1256 bit payload, assume a lowest MCS based on the bandwidth, and have a 10% BLER target. Traditional scheduling for the SIB transmission may include 44 RBs and use MCSO for the 1256 bit payload. However, this approach may create an issue for UE operating in the subset bandwidth because such traditional approaches are beyond the bandwidth capability of such UE.

Accordingly, aspects of the techniques provided herein provide for various techniques to improve coverage and recovery of repetition-based SIB transmissions in the situation where the UE operates in the subset bandwidth (e.g., 5 MHz). In some examples, the techniques described herein may be applicable to UE operating in an urban scenario. In some examples, the techniques described herein may be applicable to UE operating in a wireless network utilizing a subcarrier spacing (SCS) or 30 KHz.

For example, at 215 network entity 210 may transmit or otherwise convey (and UE 205 may receive or otherwise obtain) a grant scheduling repetition-based SIB transmissions for UE 205. The grant may include a DCI grant carried in PUCCH, such as on CORESET 0. The grant may carry or otherwise convey information identifying or otherwise indicating a mapping configuration.

At 220, UE 205 may use the mapping configuration to identify or otherwise determine the mapping configuration indicated in the DCI. The mapping configuration may indicate or otherwise identify resource(s) (e.g., time resource(s), frequency resource(s), spatial resource(s), and/or code resource(s)) for or otherwise associated with a second repetition of a SIB transmission relative to a first SIB repetition. The SIB PDSCHs (e.g., the SIB repetitions) may be repeated using a single DCI (e.g., DCI format 1_0). UE 205 may apply the DCI to the set of PDSCHs (e.g., UE 205 may use the resource(s) and parameter(s) identified in the grant for the PDSCH repetitions).

In some examples, the DCI (e.g., the mapping configuration) may be used by UE 205 to identify or otherwise select time-frequency resources for the second SIB repetition (e.g., the time-frequency resources UE 205 will monitor to detect and recover the second SIB repetition transmission). In some examples, the mapping configuration in this context may refer to or otherwise include an interleaving mapping indicated in the grant. For example, UE 205 and network entity 210 may use a cyclically shifted VRB-to-PRB mapping for the second SIB repetition relative to the first SIB repetition. For example, this may include shifting of the bandwidth (e.g., BWpDscH/2) and/or the resource blocks (e.g., 11 RBs used to convey a SIB repetition payload) of the second SIB repetition relative to the first SIB repetition. A flag (e.g., using previously reserved DCI bit(s)) in the grant may be used to indicate whether or not the initial SIB transmission (e.g., the first SIB repetition) is repeated (e.g., whether or not the second SIB repetition transmission will occur). A time domain resource allocation (TDRA) indicated in the grant (e.g., using previously reserved DCI bit(s)) may indicate a time offset (e.g., a K0 value) and/or allocated OFDM symbols used to determine the time resources for the second SIB repetition relative to the first SIB repetition. A frequency domain resource allocation (FDRA) indicated in the grant (e.g., using previously reserved DCI bit(s)) may indicate a frequency offset and/or allocated RBs used to determine the frequency domain resources for the second SIB repetition relative to the first SIB repetition. In some example, a RV indicated in the grant may be used to indicate SIB repetition. For example, previously reserved bit(s) in the grant may be used to signal a different RV for the second SIB repetition relative to the first SIB repetition. In some examples, a system information indicator may be set to 0 for the first SIB repetition.

In some aspects, the subset bandwidth that the UE operates in may be based, at least to some degree, on the SSB. As discussed above, the SSB may be received as part of the initial information a UE obtains from a network entity. The SSB is generally received in a SSB bandwidth that is smaller than the system bandwidth (e.g., the bandwidth corresponding to CORESET 0). For example, UE 205 may identify or otherwise determine the SSB bandwidth and use this to identify or otherwise determine the first and second subset bandwidths. For example, the UE RF bandwidth of UE 205 may be assumed to be aligned with the SSB bandwidth. The repeated part (e.g., the second SIB repetition) is generally transmitted using the same RF bandwidth. Thus, the different part of SIB (e.g., the second SIB repetition) is repeated (e.g., cyclic-shifted by the bandwidth size, such as 11 RBs). In this example, previously reserved bit(s) of the DCI may be used to indicate a flag identifying whether the second SIB repetition will occur, the TDRA indication for the second SIB repetition, the K0 indication and so forth.

In some examples, the first SIB repetition may be scheduled in a first subset bandwidth of the system bandwidth and the second SIB repetition may be scheduled in a second subset bandwidth. In some examples, the first and second subset bandwidths are the same bandwidth (e.g., overlapping in the frequency domain). In some examples, the first and second subset bandwidths are different bandwidths. Accordingly, UE 205 may perform a retuning operation from the first subset bandwidth to the second subset bandwidth between receiving the first SIB repetition and the second SIB repetition when the first and second subset bandwidths are different bandwidths. UE 205 may refrain from performing the retuning operations when the first and second subset bandwidths are the same bandwidth.

Accordingly, at 225 network entity 210 may transmit or otherwise provide (and UE 205 may receive or otherwise obtain) the first SIB repetition in the first subset bandwidth according to the grant. At 230, network entity 210 may transmit or otherwise provide (and UE 205 may receive or otherwise obtain) the second SIB repetition in the first subset bandwidth according to the grant (e.g., according to the mapping configuration). For example, UE 205 may monitor for the time-frequency resources for the second SIB repetition using the mapping configuration (e.g., using previously reserved bit(s) of the DCI) relative to the time-frequency resources used for the first SIB repetition.

Figure 3A:
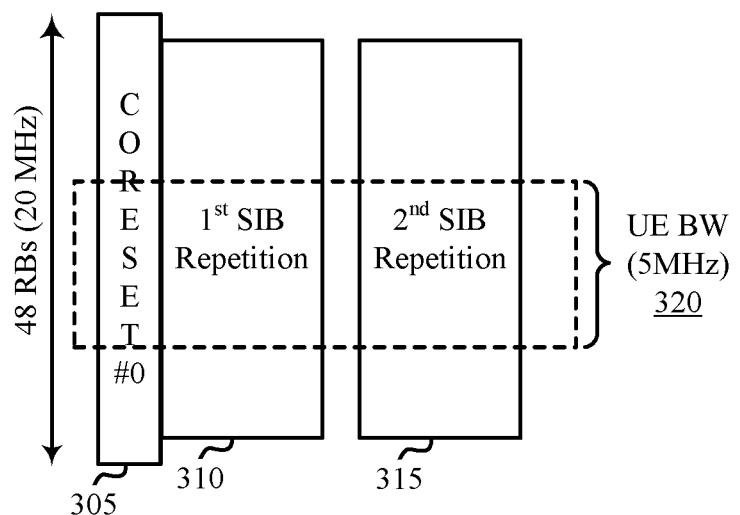
FIGS. 3A and 3B illustrate examples of a SIB configuration that supports system information transmission with coverage recovery in accordance with one or more aspects of the present disclosure.
Figure 3B:
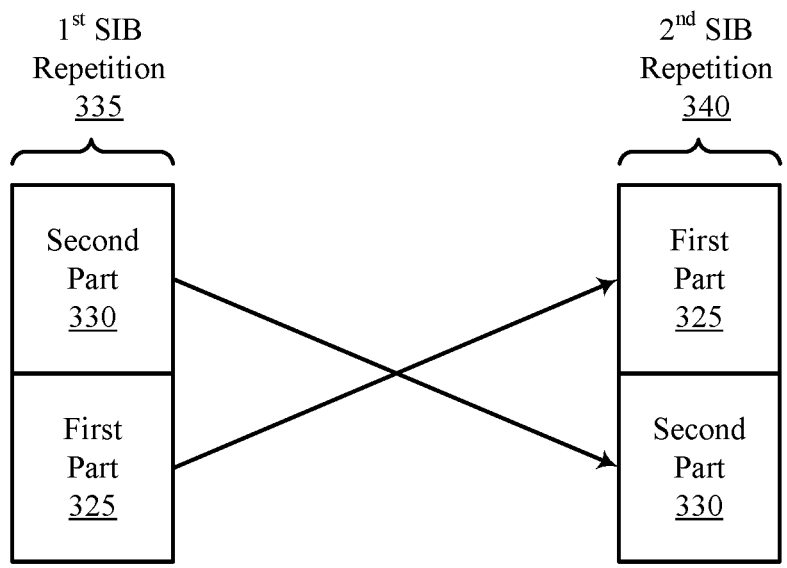

FIGS. 3A and 3B illustrate examples of a SIB configuration 300 that supports system information transmission with coverage recovery in accordance with one or more aspects of the present disclosure. SIB configuration may implement aspects of wireless communication system 100 or wireless communication system 200. Aspects of SIB configuration 300 may be implemented at or implemented by a UE or network entity, which may be examples of the corresponding devices described herein. SIB configuration 300-a of FIG. 3A illustrates repetition-based SIB transmissions scheduled by a CORESET 0 grant. SIB configuration 300-b of FIG. 3B illustrates an example of how SIB payload data can be repeated within the SIB repetitions.

As discussed above, aspects of the techniques described herein provide various techniques for improved SIB repetition scheduling. The SIB repetition scheduling may support UE coexistence when some UE operate in a subset bandwidth of the system bandwidth. For example, the techniques described herein provide for scheduling SIB repetitions in the subset bandwidth and system bandwidth to support coexistence.

Referring first to SIB configuration 300-a of FIG. 3A, this may include a UE receiving a grant 305 scheduling repetition-based SIB transmissions for the UE. The grant may carry or otherwise convey an indication of a mapping configuration. The mapping configuration may be usable to identify (e.g., carry or otherwise convey relevant information) or otherwise determine the resources (e.g., time-frequency resource(s)) for a second SIB repetition 315 relative to a first SIB repetition 310. However, first SIB repetition 310 may be received in a first subset bandwidth of the system bandwidth and second SIB repetition 315 may be received in a second subset bandwidth of the system bandwidth. Generally, the first and second subset bandwidths may be based on a UE bandwidth 320, such as the UE operating in a 5 MHz bandwidth for PDSCH. That is, UE bandwidth 320 may correspond to a reduced bandwidth relative to the system bandwidth allocated to CORESET 0 carrying grant 305.

The UE may receive first SIB repetition 310 in the first subset bandwidth and second SIB repetition 315 in the second subset bandwidth according to the grant (e.g., based on the mapping configuration indicated in the grant). In the non-limiting example illustrated in FIG. 3A, the first and second subset bandwidths may be the same bandwidths (e.g., overlapping) that corresponds to the UE bandwidth 320. However, it is to be understood that in other examples the first and second subset bandwidths may be different bandwidths such that UE retuning operations may be performed.

SIB configuration 300-b of FIG. 3B illustrates an example of how first SIB repetition 335 and second SIB repetition 340 of repetition-based SIB transmissions scheduled for a UE may be cyclically shifted (e.g., interleaved) to support a portion of SIB information being communicated in SIB repetitions. For example, the payload of a SIB may be divided into two parts (or some other number of parts), where each part is transmitted in each SIB repetition. For example, each of first SIB repetition 335 and second SIB repetition 340 may carry or otherwise convey the first part 325 and second part 330. Broadly, the sum of information carried in the first part 325 and second part 330 of a SIB repetition may correspond to the full SIB information (e.g., full payload) typically transmitted in a SIB transmission utilizing the full system bandwidth. This may enable a UE to receive a single instance of the SIB repetition including both first part 325 and second part 330 to recover the full SIB payload.

However, dividing the SIB transmission into different parts (e.g., into different subset bandwidths) may enable repetition of each part of the SIB payload across PDSCH repetitions. As discussed, both the first SIB repetition 335 and the second SIB repetition 340 may carry both the first part 325 and the second part 330. This may permit scheduling of the first SIB repetition 335 in the first subset bandwidth (e.g., in the first part 325 or the second part 330) and the second SIB repetition 340 in the second subset bandwidth (e.g., in the second part 330 or the first part 325). A UE can receive repetitions of the SIB transmissions containing both the first part 325 and the second part 330 or receive repetitions of the first part 325 or the second part 330 across SIB repetitions.

In some aspects, this may be signaled to the UE in the scheduling DCI using the mapping configuration. The mapping configuration may generally include any information relevant to the second SIB repetition 340 that is relative to the first SIB repetition 335. For example, reserved bit(s) of the DCI may be set or otherwise configured to indicate an interleaving mapping, such as a cyclic-shift (e.g., in bandwidth or RBs) of the time-frequency resources for the second SIB repetition 340 relative to the first SIB repetition 335.

In the non-limiting example illustrated in FIG. 3B, the first subset bandwidth is different than the second subset bandwidth. That is, the first part 325 is transmitted in a first subset bandwidth during the first SIB repetition 335 but transmitted in the second subset bandwidth during the second SIB repetition 340. Accordingly, the UE may perform retuning operations between receiving the first SIB repetition 335 and the second SIB repetition 340. In other examples, the first and second subset bandwidths are the same bandwidth. In these examples, the UE may refrain from performing such retuning operations.

Figure 4:
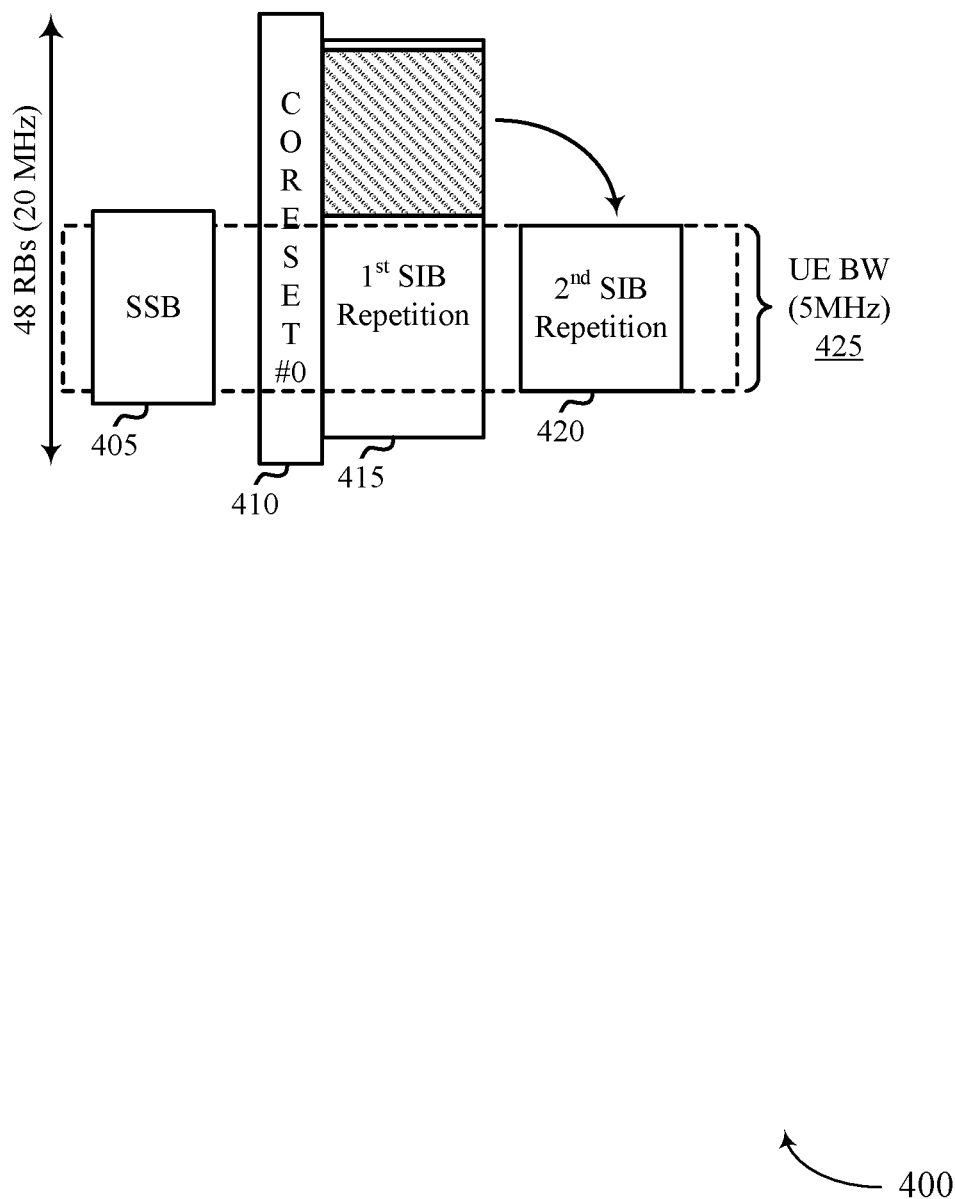
FIG. 4 illustrates an example of a SIB configuration that supports system information transmission with coverage recovery in accordance with one or more aspects of the present disclosure.

FIG. 4 illustrates an example of a SIB configuration 400 that supports system information transmission with coverage recovery in accordance with one or more aspects of the present disclosure. SIB configuration 400 may implement aspects of wireless communication systems 100 and/or 200 as well as aspects of SIB configuration 300. Aspects of SIB configuration 400 may be implemented at or implemented by a UE or network entity, which may be examples of the corresponding devices described herein.

Aspects of the techniques described herein provide various techniques for improved SIB repetition scheduling. The SIB repetition scheduling may support UE coexistence when some UE operate in a subset bandwidth of the system bandwidth. For example, the techniques described herein provide for scheduling SIB repetitions in the subset bandwidth and system bandwidth to support coexistence.

This may include a UE receiving a grant 410 scheduling repetition-based SIB transmissions for the UE. The grant may carry or otherwise convey an indication of a mapping configuration. The mapping configuration may be usable to identify (e.g., carry or otherwise convey relevant information) or otherwise determine the resources (e.g., time-frequency resource(s)) for a second SIB repetition 420 relative to a first SIB repetition 415. However, the first SIB repetition 415 may be received in a first subset bandwidth of the system bandwidth and second SIB repetition 420 may be received in a second subset bandwidth of the system bandwidth. Generally, the first and second subset bandwidths may be based on a UE bandwidth 425, such as the UE operating in a 5 MHz bandwidth for PDSCH. That is, UE bandwidth 425 may correspond to a reduced bandwidth relative to the system bandwidth allocated to CORESET 0 carrying grant 410.

The UE may receive first SIB repetition 415 in the first subset bandwidth and second SIB repetition 420 in the second subset bandwidth according to the grant (e.g., based on the mapping configuration indicated in the grant). In the non-limiting example illustrated in FIG. 4, the first and second subset bandwidths may be the same bandwidths (e.g., overlapping) that corresponds to the UE bandwidth 425. However, it is to be understood that in other examples the first and second subset bandwidths may be different bandwidths such that UE retuning operations may be performed.

SIB configuration 400 illustrates an example where the first and second subset bandwidths may be based on SSB 405. That is, SSB 405 may be transmitted by the network entity to assist UE wishing to camp on the network entity. The SIB may be a common (e.g., broadcast) transmission usable by any UE seeking to establish a connection with the network entity. However, the SSB is generally transmitted at a reduced bandwidth (e.g., a SSB bandwidth) relative to the system bandwidth (e.g., such as the bandwidth allocated to CORESET 0). When scheduling repetition-based SIB transmissions, the network entity may consider the SSB bandwidth. Adopting the SSB bandwidth, at least to some degree, as the subset bandwidths (or otherwise basing the first and second subset bandwidths on the SSB bandwidth) used for SIB repetition may improve detection and recovery of the SIB information. Accordingly, the resources allocated to the first SIB repetition 415 and the second SIB repetition second SIB repetition 420 may include frequency resources corresponding to the first and second subset bandwidths, where the frequency resources are based on (e.g., aligned with) the SSB bandwidth.

Figure 5A:
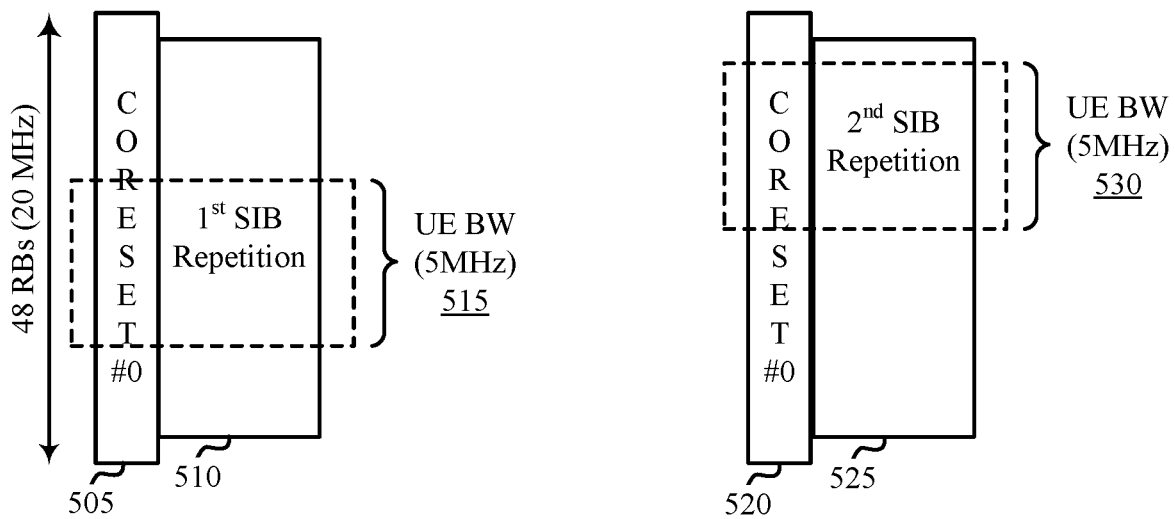
FIGS. 5A and 5B illustrate examples of a SIB configuration that supports system information transmission with coverage recovery in accordance with one or more aspects of the present disclosure.
Figure 5B:
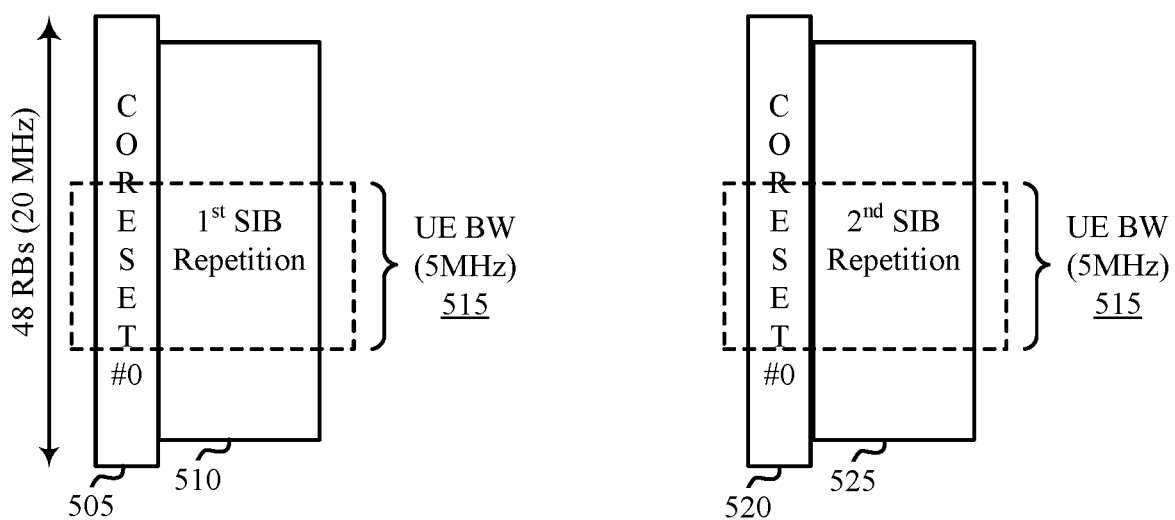

FIGS. 5A and 5B illustrate examples of a SIB configuration 500 that supports system information transmission with coverage recovery in accordance with one or more aspects of the present disclosure. SIB configuration 500 may implement aspects of wireless communication systems 100 and/or 200 as well as aspects of SIB configurations 300 and/or 400. Aspects of SIB configuration 500 may be implemented at or implemented by a UE or network entity, which may be examples of the corresponding devices described herein.

Additionally, or alternatively, aspects of the techniques further relate to SIB repetition scheduling improvements where each SIB repetition is scheduled by its own DCI. For example, the UE may receive a first grant 505 scheduling a first SIB repetition 510 and a second grant 520 scheduling a second SIB repetition 525. This may support multiple PDSCH reception (with or without retuning). The SIB PDSCHs (e.g., SIB 1 PDSCHs) may be communicated in multiple occasions (e.g., in different repetitions) and used for combining by the receiving device.

In some aspects, a scheduling constraint may be applied across the first grant 505 and the second grant 520. Generally, the scheduling constraint may identify a set of common resource(s) and/or parameter(s) that are shared in both the first grant 505 and the second grant 520. Examples of such scheduling constraints include, but are not limited to, a shared or common MCS, a shared or common FDRA, a shared or common TDRA, a shared or common interleaved interleaving mapping (e.g., a shared or common VRB-to-PRB mapping), a shared or common RV, or any combination(s) thereof. This may enable maintaining parameters between the first grant 505 and the second grant 520. Thus, aspects of the resource(s) and/or parameter(s) signaled in first grant 505 scheduling first SIB repetition 510 are maintained (e.g., the same, shared, or otherwise common) for second grant 520 scheduling the second SIB repetition 525.

In some aspects, one or both of first grant 505 and second grant 520 may include a flag indicating whether the contends of the SIB transmission are shared between the SIB repetitions. For example, some SIB repetitions may cross a boundary (e.g., a slot boundary in the time domain) such that the contents of the SIB transmission (e.g., the SIB payload) changes. This flag may be set to a value by the network entity based on when the first SIB repetition 510 and second SIB repetition 525 are transmitted relative to the boundary.

In some aspects, a RV may be set to a value to indicate whether the second SIB repetition 525 transmission will occur. For example, first grant 505 may carry or otherwise convey an indication that second SIB repetition 525 will occur. The UE may use this flag to monitor for the second grant 520. In some aspects, the VRB-to-PRB mapping may include interleaved, such as in a puncturing scenario.

As discussed above, in some examples the first SIB repetition 510 is received in a first subset bandwidth and the second SIB repetition 525 is received in a second subset bandwidth, although the techniques discussed herein are not limited to PDSCH repetition operations in subset bandwidths.

SIB configuration 500-a of FIG. 5A illustrates an example where the first subset bandwidth and the second subset bandwidth are different bandwidths (e.g., not overlapping, or at least not fully overlapping). Accordingly, the first SIB repetition 510 may be received in a first subset bandwidth that is based on UE bandwidth 515 and the second SIB repetition 525 may be received in a second subset bandwidth that is based on UE bandwidth 530. The UE may therefore receive the first repetition (e.g., the first SIB repetition 510) in the first subset bandwidth and the second repetition (e.g., the second SIB repetition 525) in the second subset bandwidth that is different from the first subset bandwidth. The UE may perform retuning operations from the first subset bandwidth to the second subset bandwidth based on the different bandwidth.

SIB configuration 500-b of FIG. 5B illustrates an example where the first subset bandwidth and the second subset bandwidth are the same bandwidth (e.g., overlapping, or at least overlapping above a threshold). Accordingly, the first SIB repetition 510 may be received in a first subset bandwidth that is based on UE bandwidth 515 and the second SIB repetition 525 may be received in a second subset bandwidth that is also based on UE bandwidth 515. The UE may therefore receive the first repetition (e.g., the first SIB repetition 510) in the first subset bandwidth and the second repetition (e.g., the second SIB repetition 525) in the second subset bandwidth that is the same bandwidth as the first subset bandwidth. The UE may refrain from performing retuning operations from the first subset bandwidth to the second subset bandwidth based on the same bandwidth.

Figure 6:
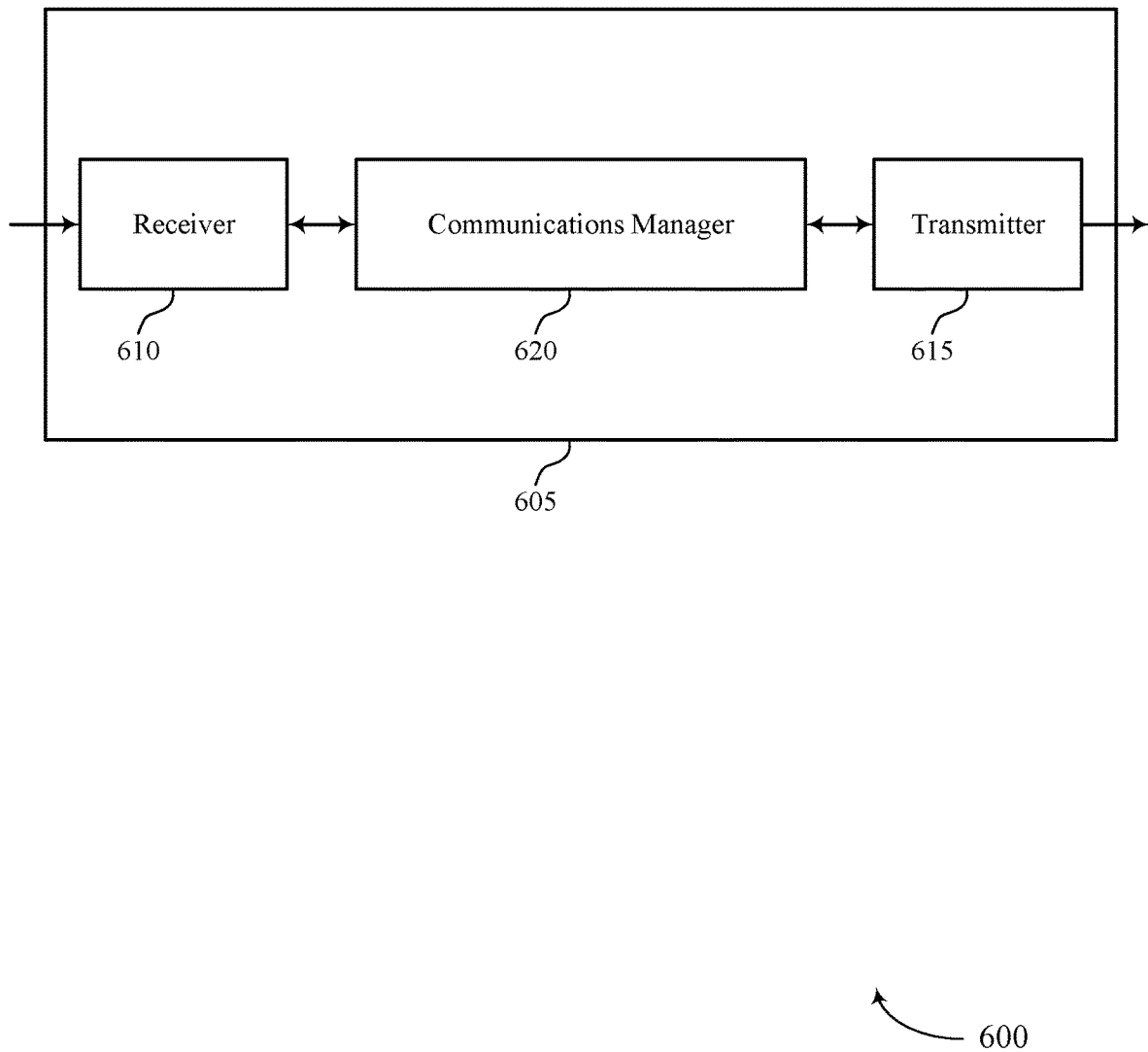
FIGS. 6 and 7 show block diagrams of devices that support system information transmission with coverage recovery in accordance with one or more aspects of the present disclosure.

FIG. 6 shows a block diagram 600 of a device 605 that supports system information transmission with coverage recovery in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to system information transmission with coverage recovery). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to system information transmission with coverage recovery). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of system information transmission with coverage recovery as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving a grant scheduling repetition-based SIB transmissions for the UE, the grant indicating a mapping configuration identifying time-frequency resources for a second repetition of a SIB transmission relative to a first repetition of the SIB transmission. The communications manager 620 may be configured as or otherwise support a means for receiving, in a first subset bandwidth of a system bandwidth, the first repetition of the SIB transmission according to the grant. The communications manager 620 may be configured as or otherwise support a means for receiving, in a second subset bandwidth of the system bandwidth, the second repetition of the SIB transmission according to the grant and based on the mapping configuration.

Additionally, or alternatively, the communications manager 620 may support wireless communication at a UE in accordance with examples as disclosed herein. For example, the communications manager 620 may be configured as or otherwise support a means for receiving a first repetition of a SIB transmission according to a first grant scheduling the first repetition. The communications manager 620 may be configured as or otherwise support a means for receiving a second repetition of the SIB transmission according to a second grant scheduling the second repetition, the receiving based on a scheduling constraint associated with the first grant and the second grant that maintains one or more transmission parameters between the first grant scheduling the first repetition and the second grant scheduling the second repetition of the SIB transmission.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for improved SIB repetition scheduling supporting coexistence between UE operating in a reduced bandwidth (e.g., operating in a subset bandwidth) and UE operating in a system bandwidth.

Figure 7:
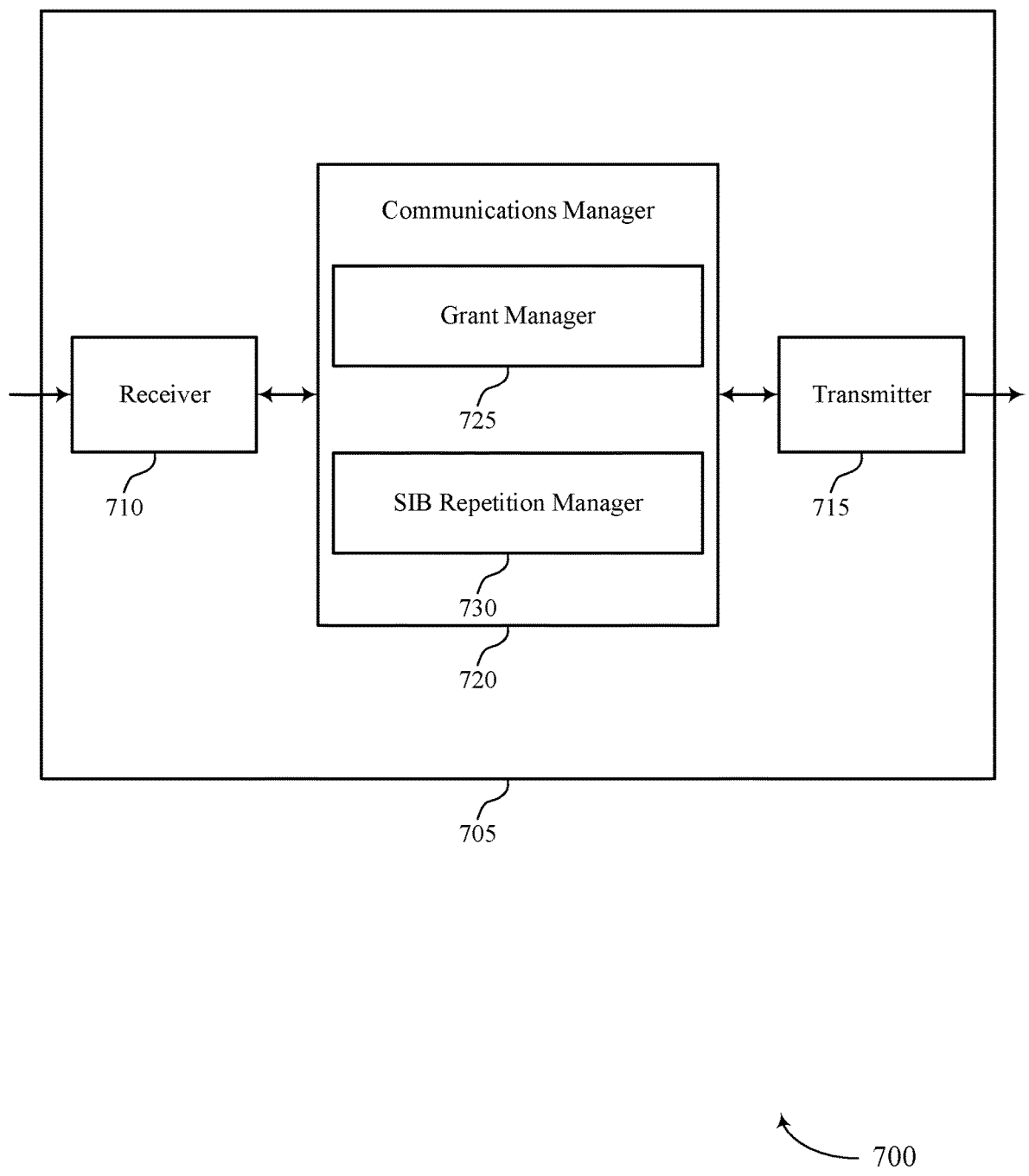

FIG. 7 shows a block diagram 700 of a device 705 that supports system information transmission with coverage recovery in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to system information transmission with coverage recovery). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to system information transmission with coverage recovery). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of system information transmission with coverage recovery as described herein. For example, the communications manager 720 may include a grant manager 725 an SIB repetition manager 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The grant manager 725 may be configured as or otherwise support a means for receiving a grant scheduling repetition-based SIB transmissions for the UE, the grant indicating a mapping configuration identifying time-frequency resources for a second repetition of a SIB transmission relative to a first repetition of the SIB transmission. The SIB repetition manager 730 may be configured as or otherwise support a means for receiving, in a first subset bandwidth of a system bandwidth, the first repetition of the SIB transmission according to the grant. The SIB repetition manager 730 may be configured as or otherwise support a means for receiving, in a second subset bandwidth of the system bandwidth, the second repetition of the SIB transmission according to the grant and based on the mapping configuration.

Additionally, or alternatively, the communications manager 720 may support wireless communication at a UE in accordance with examples as disclosed herein. The SIB repetition manager 730 may be configured as or otherwise support a means for receiving a first repetition of a SIB transmission according to a first grant scheduling the first repetition. The SIB repetition manager 730 may be configured as or otherwise support a means for receiving a second repetition of the SIB transmission according to a second grant scheduling the second repetition, the receiving based on a scheduling constraint associated with the first grant and the second grant that maintains one or more transmission parameters between the first grant scheduling the first repetition and the second grant scheduling the second repetition of the SIB transmission.

Figure 8:
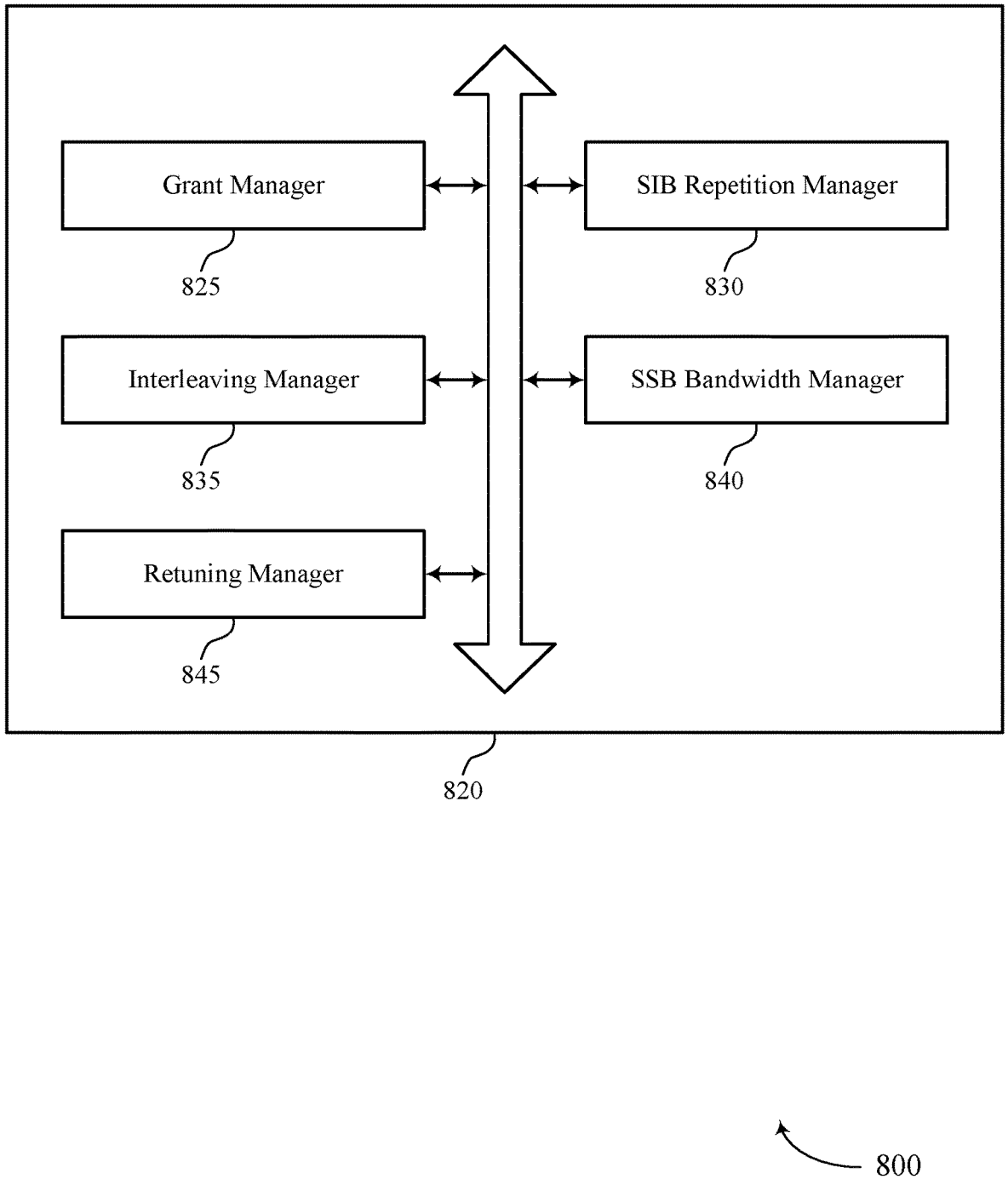
FIG. 8 shows a block diagram of a communications manager that supports system information transmission with coverage recovery in accordance with one or more aspects of the present disclosure.

FIG. 8 shows a block diagram 800 of a communications manager 820 that supports system information transmission with coverage recovery in accordance with one or more aspects of the present disclosure. The communications manager 820 may be an example of aspects of a communications manager 620, a communications manager 720, or both, as described herein. The communications manager 820, or various components thereof, may be an example of means for performing various aspects of system information transmission with coverage recovery as described herein. For example, the communications manager 820 may include a grant manager 825, an SIB repetition manager 830, an interleaving manager 835, an SSB bandwidth manager 840, a retuning manager 845, or any combination thereof. Each of these components may communicate, directly or indirectly, with one another (e.g., via one or more buses).

The communications manager 820 may support wireless communication at a UE in accordance with examples as disclosed herein. The grant manager 825 may be configured as or otherwise support a means for receiving a grant scheduling repetition-based SIB transmissions for the UE, the grant indicating a mapping configuration identifying time-frequency resources for a second repetition of a SIB transmission relative to a first repetition of the SIB transmission. The SIB repetition manager 830 may be configured as or otherwise support a means for receiving, in a first subset bandwidth of a system bandwidth, the first repetition of the SIB transmission according to the grant. In some examples, the SIB repetition manager 830 may be configured as or otherwise support a means for receiving, in a second subset bandwidth of the system bandwidth, the second repetition of the SIB transmission according to the grant and based on the mapping configuration.

In some examples, the interleaving manager 835 may be configured as or otherwise support a means for selecting a set of time-frequency resources for the second repetition of the SIB transmission based on an interleaving mapping indicated in the grant, where the mapping configuration includes the interleaving mapping.

In some examples, the interleaving manager 835 may be configured as or otherwise support a means for detecting, in the grant, a repetition flag set to a value indicating that the second repetition of the SIB transmission will occur. In some examples, the interleaving manager 835 may be configured as or otherwise support a means for selecting the set of time-frequency resources for the second repetition of the SIB transmission based on the repetition flag and a time domain resource allocation indicated in the grant.

In some examples, the interleaving manager 835 may be configured as or otherwise support a means for detecting, in the grant, a redundancy version set to a value indicating that the second repetition of the SIB transmission will occur. In some examples, the interleaving manager 835 may be configured as or otherwise support a means for selecting the set of time-frequency resources for the second repetition of the SIB transmission based on the redundancy version and a time domain resource allocation indicated in the grant. In some examples, the set of time-frequency resources associated with the interleaving mapping includes a cyclic shifting of the system bandwidth, cyclic shifting of one or more resource blocks, or a combination thereof.

In some examples, the SSB bandwidth manager 840 may be configured as or otherwise support a means for determining a synchronization signal block bandwidth based on the system bandwidth, where the first subset bandwidth and the second subset bandwidth are based on the synchronization signal block bandwidth.

In some examples, the retuning manager 845 may be configured as or otherwise support a means for performing a retuning operation (e.g., a frequency retuning operation) to retune from the first subset bandwidth to the second subset bandwidth between receiving the first repetition and the second repetition of the SIB transmission, where the second subset bandwidth includes a different bandwidth relative to the first subset bandwidth. In some examples, the retuning manager 845 may be configured as or otherwise support a means for refraining from performing a retuning operation (e.g., a frequency retuning operation) to retune from the first subset bandwidth to the second subset bandwidth between receiving the first repetition and the second repetition of the SIB transmission, where the second subset bandwidth includes a same bandwidth relative to the first subset bandwidth.

Additionally, or alternatively, the communications manager 820 may support wireless communication at a UE in accordance with examples as disclosed herein. In some examples, the SIB repetition manager 830 may be configured as or otherwise support a means for receiving a first repetition of a SIB transmission according to a first grant scheduling the first repetition. In some examples, the SIB repetition manager 830 may be configured as or otherwise support a means for receiving a second repetition of the SIB transmission according to a second grant scheduling the second repetition, the receiving based on a scheduling constraint associated with the first grant and the second grant that maintains one or more transmission parameters between the first grant scheduling the first repetition and the second grant scheduling the second repetition of the SIB transmission.

In some examples, the retuning manager 845 may be configured as or otherwise support a means for receiving the first repetition in a first subset bandwidth of a system bandwidth and receiving the second repetition in a second subset bandwidth of the system bandwidth, where the second subset bandwidth includes a different bandwidth relative to the first subset bandwidth. In some examples, the retuning manager 845 may be configured as or otherwise support a means for receiving the first repetition in a first subset bandwidth of a system bandwidth and receiving the second repetition in a second subset bandwidth of the system bandwidth, where the second subset bandwidth includes a same bandwidth relative to the first subset bandwidth.

In some examples, the retuning manager 845 may be configured as or otherwise support a means for selecting a set of time-frequency resources for the second repetition of the SIB transmission based on a redundancy version set to a value indicating that the second repetition of the SIB transmission will occur.

In some examples, the SIB repetition manager 830 may be configured as or otherwise support a means for detecting a flag in the first grant set to a value to indicate whether contents of the SIB transmission are shared between the first repetition and the second repetition. In some examples, the scheduling constraint includes a shared modulation and coding scheme, a shared frequency domain resource allocation, a shared interleaved interleaving mapping, a shared redundancy version, or a combination thereof.

Figure 9:
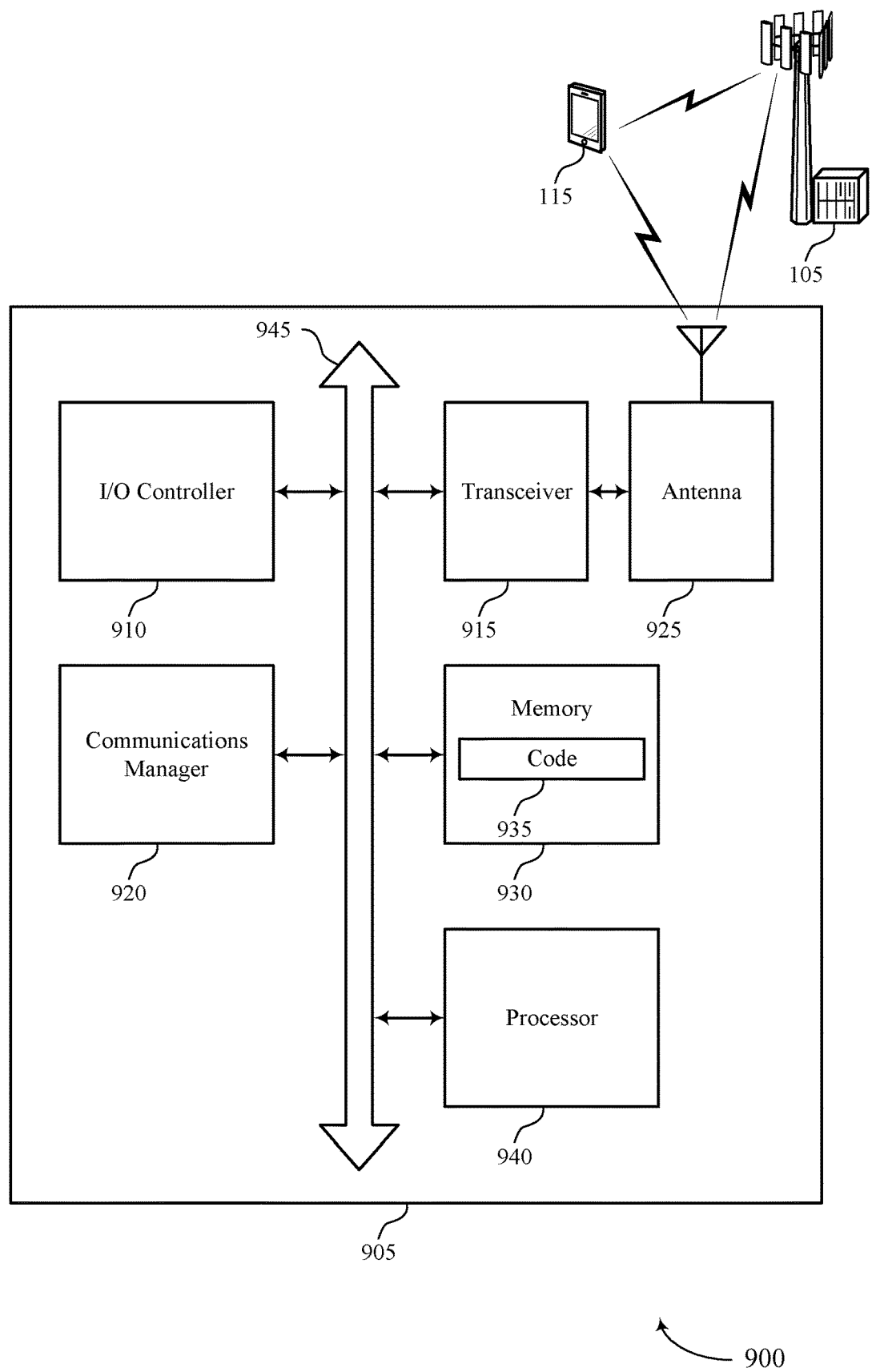
FIG. 9 shows a diagram of a system including a device that supports system information transmission with coverage recovery in accordance with one or more aspects of the present disclosure.

FIG. 9 shows a diagram of a system 900 including a device 905 that supports system information transmission with coverage recovery in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting system information transmission with coverage recovery). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a grant scheduling repetition-based SIB transmissions for the UE, the grant indicating a mapping configuration identifying time-frequency resources for a second repetition of a SIB transmission relative to a first repetition of the SIB transmission. The communications manager 920 may be configured as or otherwise support a means for receiving, in a first subset bandwidth of a system bandwidth, the first repetition of the SIB transmission according to the grant. The communications manager 920 may be configured as or otherwise support a means for receiving, in a second subset bandwidth of the system bandwidth, the second repetition of the SIB transmission according to the grant and based on the mapping configuration.

Additionally, or alternatively, the communications manager 920 may support wireless communication at a UE in accordance with examples as disclosed herein. For example, the communications manager 920 may be configured as or otherwise support a means for receiving a first repetition of a SIB transmission according to a first grant scheduling the first repetition. The communications manager 920 may be configured as or otherwise support a means for receiving a second repetition of the SIB transmission according to a second grant scheduling the second repetition, the receiving based on a scheduling constraint associated with the first grant and the second grant that maintains one or more transmission parameters between the first grant scheduling the first repetition and the second grant scheduling the second repetition of the SIB transmission.

By including or configuring the communications manager 920 in accordance with examples as described herein, the device 905 may support techniques for improved SIB repetition scheduling supporting coexistence between UE operating in a reduced bandwidth (e.g., operating in a subset bandwidth) and UE operating in a system bandwidth.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of system information transmission with coverage recovery as described herein, or the processor 940 and the memory 930 may be otherwise configured to perform or support such operations.

Figure 10:
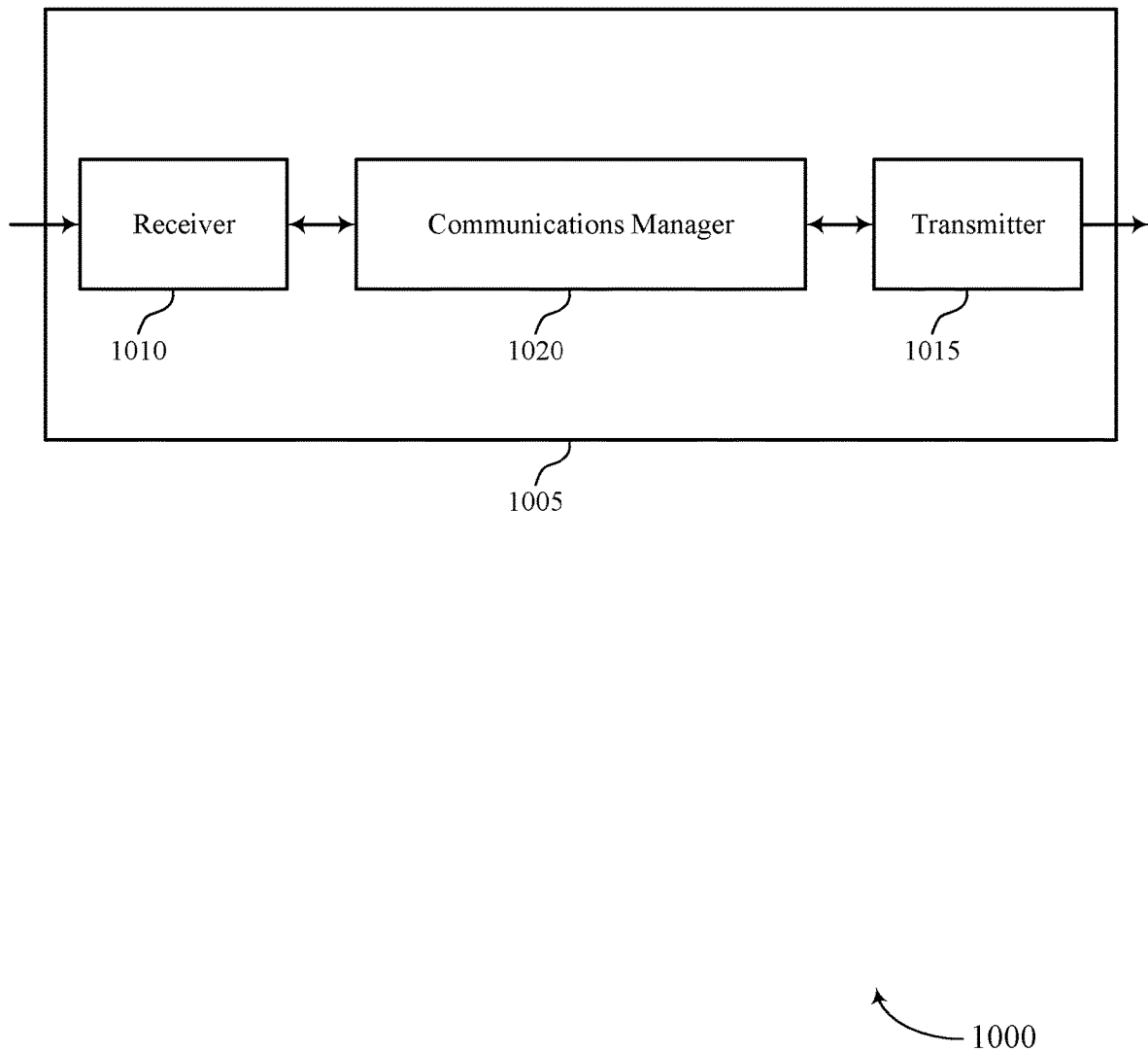
FIGS. 10 and 11 show block diagrams of devices that support system information transmission with coverage recovery in accordance with one or more aspects of the present disclosure.

FIG. 10 shows a block diagram 1000 of a device 1005 that supports system information transmission with coverage recovery in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of system information transmission with coverage recovery as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting a grant scheduling repetition-based SIB transmissions for a UE, the grant indicating a mapping configuration identifying time-frequency resources for a second repetition of a SIB transmission relative to a first repetition of the SIB transmission. The communications manager 1020 may be configured as or otherwise support a means for transmitting, in a first subset bandwidth of a system bandwidth, the first repetition of the SIB transmission according to the grant. The communications manager 1020 may be configured as or otherwise support a means for transmitting, in a second subset bandwidth of the system bandwidth, the second repetition of the SIB transmission according to the grant and based on the mapping configuration.

Additionally, or alternatively, the communications manager 1020 may support wireless communication at a network entity in accordance with examples as disclosed herein. For example, the communications manager 1020 may be configured as or otherwise support a means for transmitting a first repetition of a SIB transmission according to a first grant scheduling the first repetition for a UE. The communications manager 1020 may be configured as or otherwise support a means for transmitting a second repetition of the SIB transmission according to a second grant scheduling the second repetition, the transmitting based on a scheduling constraint associated with the first grant and the second grant that maintains one or more transmission parameters between the first grant scheduling the first repetition and the second grant scheduling the second repetition of the SIB transmission.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for improved SIB repetition scheduling supporting coexistence between UE operating in a reduced bandwidth (e.g., operating in a subset bandwidth) and UE operating in a system bandwidth.

Figure 11:
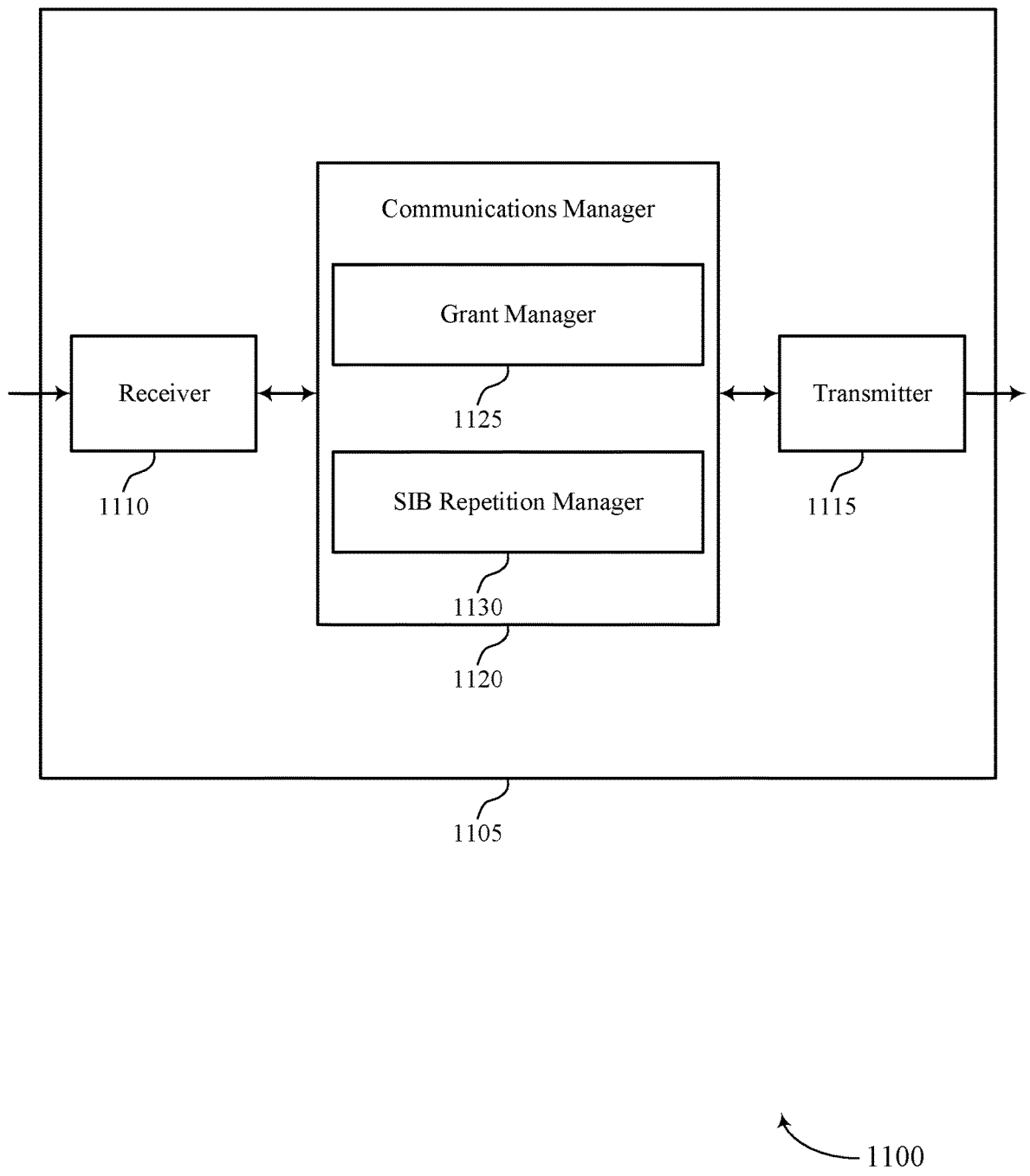

FIG. 11 shows a block diagram 1100 of a device 1105 that supports system information transmission with coverage recovery in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of system information transmission with coverage recovery as described herein. For example, the communications manager 1120 may include a grant manager 1125 an SIB repetition manager 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The grant manager 1125 may be configured as or otherwise support a means for transmitting a grant scheduling repetition-based SIB transmissions for a UE, the grant indicating a mapping configuration identifying time-frequency resources for a second repetition of a SIB transmission relative to a first repetition of the SIB transmission. The SIB repetition manager 1130 may be configured as or otherwise support a means for transmitting, in a first subset bandwidth of a system bandwidth, the first repetition of the SIB transmission according to the grant. The SIB repetition manager 1130 may be configured as or otherwise support a means for transmitting, in a second subset bandwidth of the system bandwidth, the second repetition of the SIB transmission according to the grant and based on the mapping configuration.

Additionally, or alternatively, the communications manager 1120 may support wireless communication at a network entity in accordance with examples as disclosed herein. The SIB repetition manager 1130 may be configured as or otherwise support a means for transmitting a first repetition of a SIB transmission according to a first grant scheduling the first repetition for a UE. The SIB repetition manager 1130 may be configured as or otherwise support a means for transmitting a second repetition of the SIB transmission according to a second grant scheduling the second repetition, the transmitting based on a scheduling constraint associated with the first grant and the second grant that maintains one or more transmission parameters between the first grant scheduling the first repetition and the second grant scheduling the second repetition of the SIB transmission.

Figure 12:
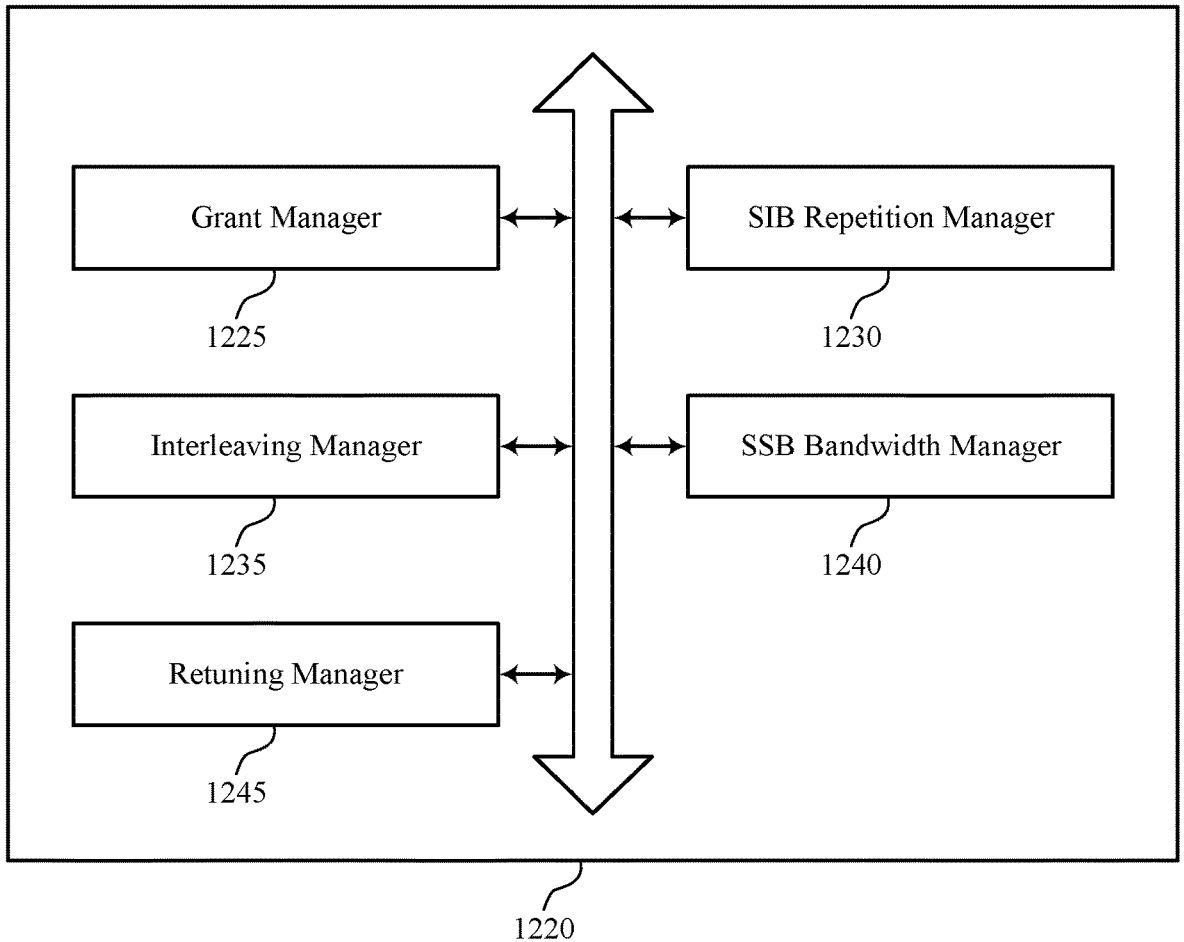
FIG. 12 shows a block diagram of a communications manager that supports system information transmission with coverage recovery in accordance with one or more aspects of the present disclosure.

FIG. 12 shows a block diagram 1200 of a communications manager 1220 that supports system information transmission with coverage recovery in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of system information transmission with coverage recovery as described herein. For example, the communications manager 1220 may include a grant manager 1225, an SIB repetition manager 1230, an interleaving manager 1235, an SSB bandwidth manager 1240, a retuning manager 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The grant manager 1225 may be configured as or otherwise support a means for transmitting a grant scheduling repetition-based SIB transmissions for a UE, the grant indicating a mapping configuration identifying time-frequency resources for a second repetition of a SIB transmission relative to a first repetition of the SIB transmission. The SIB repetition manager 1230 may be configured as or otherwise support a means for transmitting, in a first subset bandwidth of a system bandwidth, the first repetition of the SIB transmission according to the grant. In some examples, the SIB repetition manager 1230 may be configured as or otherwise support a means for transmitting, in a second subset bandwidth of the system bandwidth, the second repetition of the SIB transmission according to the grant and based on the mapping configuration.

In some examples, the interleaving manager 1235 may be configured as or otherwise support a means for selecting a set of time-frequency resources for the second repetition of the SIB transmission based on an interleaving mapping indicated in the grant, where the mapping configuration includes the interleaving mapping.

In some examples, the interleaving manager 1235 may be configured as or otherwise support a means for detecting, in the grant, a repetition flag set to a value indicating that the second repetition of the SIB transmission will occur. In some examples, the interleaving manager 1235 may be configured as or otherwise support a means for selecting the set of time-frequency resources for the second repetition of the SIB transmission based on the repetition flag and a time domain resource allocation indicated in the grant.

In some examples, the interleaving manager 1235 may be configured as or otherwise support a means for configuring, in the grant, a redundancy version set to a value indicating that the second repetition of the SIB transmission will occur. In some examples, the interleaving manager 1235 may be configured as or otherwise support a means for selecting the set of time-frequency resources for the second repetition of the SIB transmission based on the redundancy version and a time domain resource allocation indicated in the grant. In some examples, the set of time-frequency resources associated with the interleaving mapping includes a cyclic shifting of the system bandwidth, cyclic shifting of one or more resource blocks, or a combination thereof.

In some examples, the SSB bandwidth manager 1240 may be configured as or otherwise support a means for determining a synchronization signal block bandwidth based on the system bandwidth, where the first subset bandwidth and the second subset bandwidth are based on the synchronization signal block bandwidth.

In some examples, the retuning manager 1245 may be configured as or otherwise support a means for performing a retuning operation (e.g., a frequency retuning operation) to retune from the first subset bandwidth to the second subset bandwidth between transmitting the first repetition and the second repetition of the SIB transmission, where the second subset bandwidth includes a different bandwidth relative to the first subset bandwidth. In some examples, the retuning manager 1245 may be configured as or otherwise support a means for refraining from performing a retuning operation (e.g., a frequency retuning operation) to retune from the first subset bandwidth to the second subset bandwidth between transmitting the first repetition and the second repetition of the SIB transmission, where the second subset bandwidth includes a same bandwidth relative to the first subset bandwidth.

Additionally, or alternatively, the communications manager 1220 may support wireless communication at a network entity in accordance with examples as disclosed herein. In some examples, the SIB repetition manager 1230 may be configured as or otherwise support a means for transmitting a first repetition of a SIB transmission according to a first grant scheduling the first repetition for a UE. In some examples, the SIB repetition manager 1230 may be configured as or otherwise support a means for transmitting a second repetition of the SIB transmission according to a second grant scheduling the second repetition, the transmitting based on a scheduling constraint associated with the first grant and the second grant that maintains one or more transmission parameters between the first grant scheduling the first repetition and the second grant scheduling the second repetition of the SIB transmission.

In some examples, the retuning manager 1245 may be configured as or otherwise support a means for transmitting the first repetition in a first subset bandwidth of a system bandwidth and transmitting the second repetition in a second subset bandwidth of the system bandwidth, where the second subset bandwidth includes a different bandwidth relative to the first subset bandwidth. In some examples, the retuning manager 1245 may be configured as or otherwise support a means for transmitting the first repetition in a first subset bandwidth of a system bandwidth and transmitting the second repetition in a second subset bandwidth of the system bandwidth, where the second subset bandwidth includes a same bandwidth relative to the first subset bandwidth.

In some examples, the retuning manager 1245 may be configured as or otherwise support a means for selecting a set of time-frequency resources for the second repetition of the SIB transmission based on a redundancy version set to a value indicating that the second repetition of the SIB transmission will occur. In some examples, the SIB repetition manager 1230 may be configured as or otherwise support a means for setting a flag in the first grant to a value to indicate whether contents of the SIB transmission are shared between the first repetition and the second repetition. In some examples, the scheduling constraint includes a shared modulation and coding scheme, a shared frequency domain resource allocation, a shared interleaving mapping, a shared redundancy version, or a combination thereof.

Figure 13:
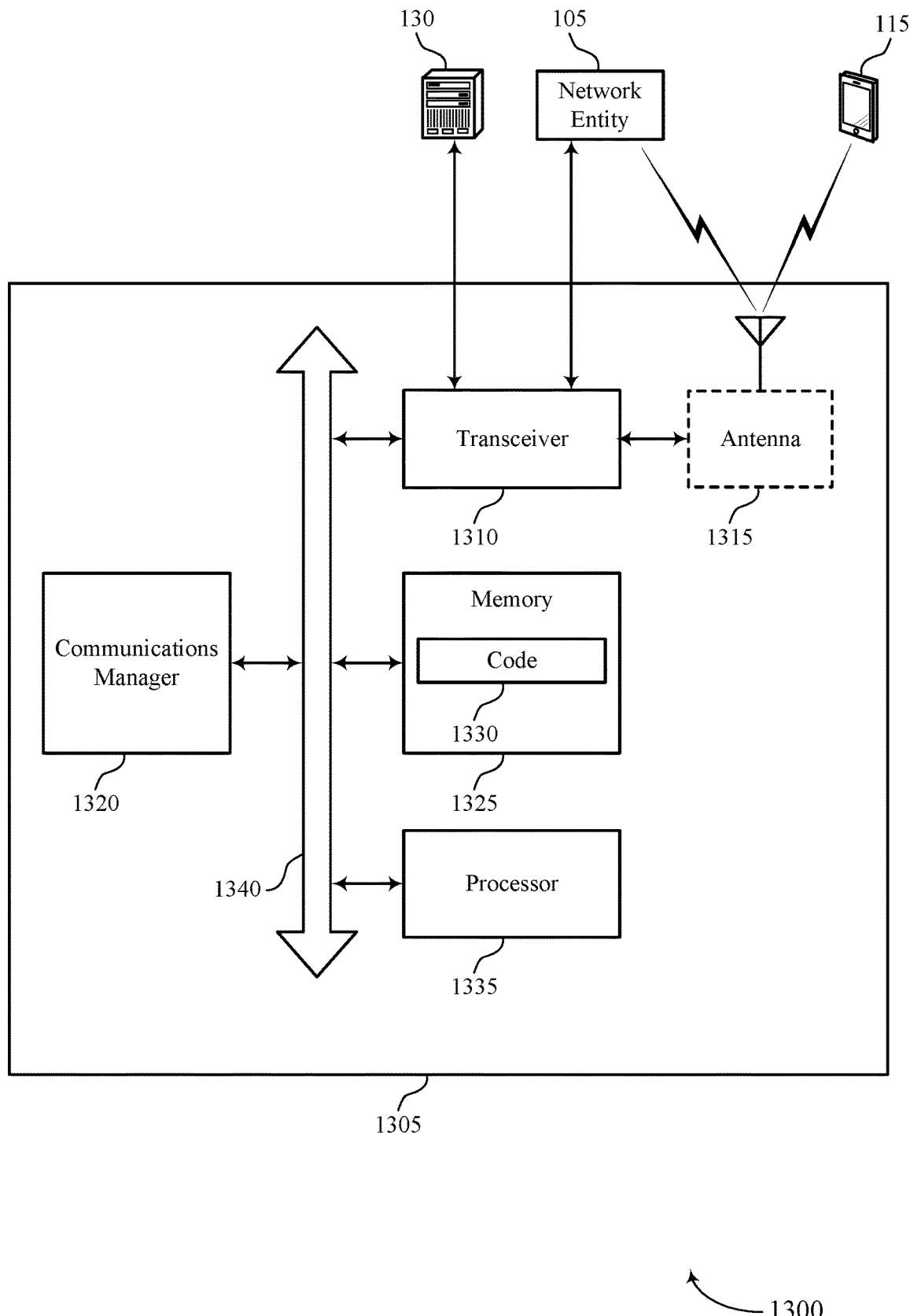
FIG. 13 shows a diagram of a system including a device that supports system information transmission with coverage recovery in accordance with one or more aspects of the present disclosure.

FIG. 13 shows a diagram of a system 1300 including a device 1305 that supports system information transmission with coverage recovery in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting system information transmission with coverage recovery). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting a grant scheduling repetition-based SIB transmissions for a UE, the grant indicating a mapping configuration identifying time-frequency resources for a second repetition of a SIB transmission relative to a first repetition of the SIB transmission. The communications manager 1320 may be configured as or otherwise support a means for transmitting, in a first subset bandwidth of a system bandwidth, the first repetition of the SIB transmission according to the grant. The communications manager 1320 may be configured as or otherwise support a means for transmitting, in a second subset bandwidth of the system bandwidth, the second repetition of the SIB transmission according to the grant and based on the mapping configuration.

Additionally, or alternatively, the communications manager 1320 may support wireless communication at a network entity in accordance with examples as disclosed herein. For example, the communications manager 1320 may be configured as or otherwise support a means for transmitting a first repetition of a SIB transmission according to a first grant scheduling the first repetition for a UE. The communications manager 1320 may be configured as or otherwise support a means for transmitting a second repetition of the SIB transmission according to a second grant scheduling the second repetition, the transmitting based on a scheduling constraint associated with the first grant and the second grant that maintains one or more transmission parameters between the first grant scheduling the first repetition and the second grant scheduling the second repetition of the SIB transmission.

By including or configuring the communications manager 1320 in accordance with examples as described herein, the device 1305 may support techniques for improved SIB repetition scheduling supporting coexistence between UE operating in a reduced bandwidth (e.g., operating in a subset bandwidth) and UE operating in a system bandwidth.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of system information transmission with coverage recovery as described herein, or the processor 1335 and the memory 1325 may be otherwise configured to perform or support such operations.

Figure 14:
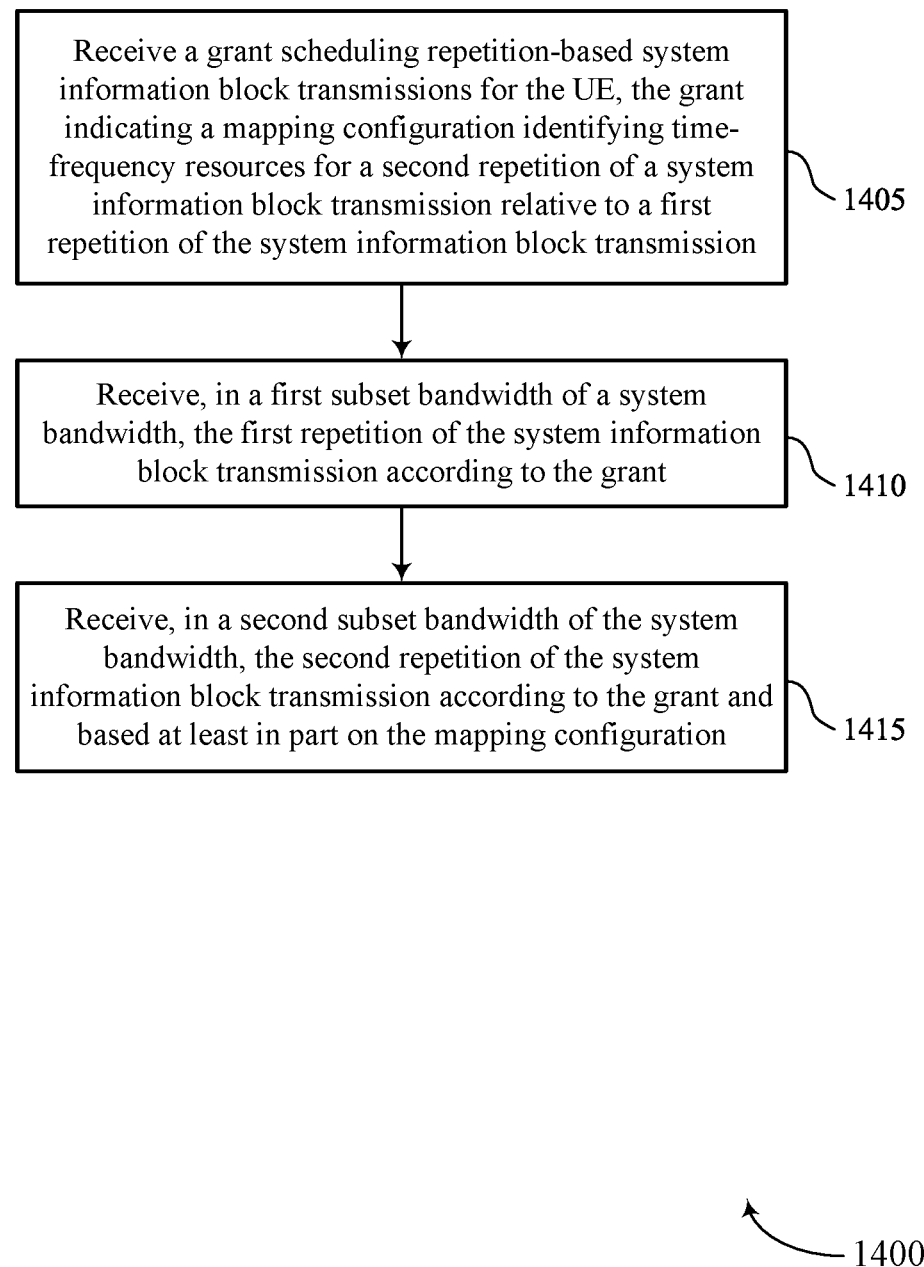
FIGS. 14 through 17 show flowcharts illustrating methods that support system information transmission with coverage recovery in accordance with one or more aspects of the present disclosure.

FIG. 14 shows a flowchart illustrating a method 1400 that supports system information transmission with coverage recovery in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a grant scheduling repetition-based SIB transmissions for the UE, the grant indicating a mapping configuration identifying time-frequency resources for a second repetition of a SIB transmission relative to a first repetition of the SIB transmission. The operations of 1405 may be performed in accordance with examples as disclosed herein. In some examples, aspects of the operations of 1405 may be performed by a grant manager 825 as described with reference to FIG. 8.

At 1410, the method may include receiving, in a first subset bandwidth of a system bandwidth, the first repetition of the SIB transmission according to the grant. The operations of 1410 may be performed in accordance with examples as disclosed herein. In some examples, aspects of the operations of 1410 may be performed by an SIB repetition manager 830 as described with reference to FIG. 8.

At 1415, the method may include receiving, in a second subset bandwidth of the system bandwidth, the second repetition of the SIB transmission according to the grant and based on the mapping configuration. The operations of 1415 may be performed in accordance with examples as disclosed herein. In some examples, aspects of the operations of 1415 may be performed by an SIB repetition manager 830 as described with reference to FIG. 8.

Figure 15:
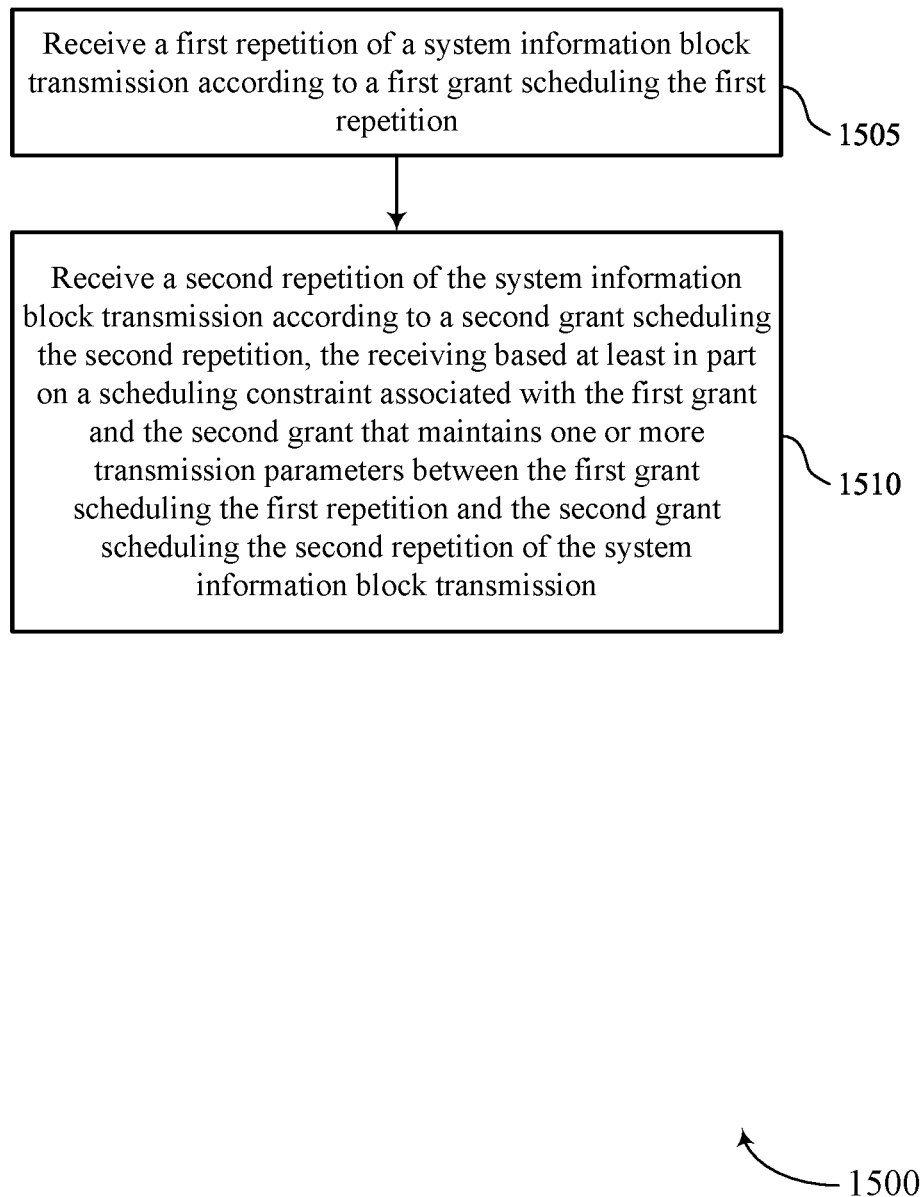

FIG. 15 shows a flowchart illustrating a method 1500 that supports system information transmission with coverage recovery in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a first repetition of a SIB transmission according to a first grant scheduling the first repetition. The operations of 1505 may be performed in accordance with examples as disclosed herein. In some examples, aspects of the operations of 1505 may be performed by an SIB repetition manager 830 as described with reference to FIG. 8.

At 1510, the method may include receiving a second repetition of the SIB transmission according to a second grant scheduling the second repetition, the receiving based on a scheduling constraint associated with the first grant and the second grant that maintains one or more transmission parameters between the first grant scheduling the first repetition and the second grant scheduling the second repetition of the SIB transmission. The operations of 1510 may be performed in accordance with examples as disclosed herein.

In some examples, aspects of the operations of 1510 may be performed by an SIB repetition manager 830 as described with reference to FIG. 8.

Figure 16:
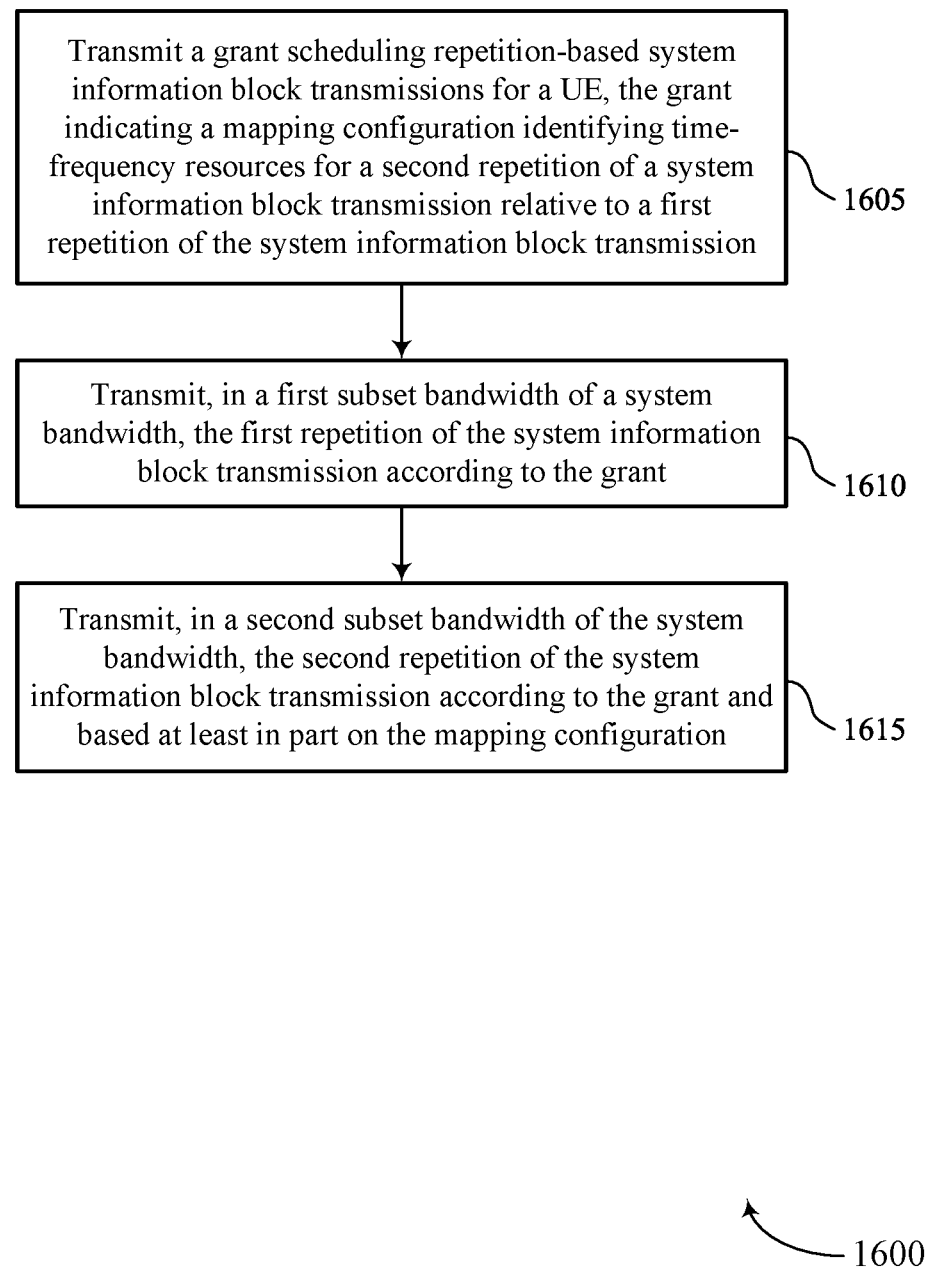

FIG. 16 shows a flowchart illustrating a method 1600 that supports system information transmission with coverage recovery in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a grant scheduling repetition-based SIB transmissions for a UE, the grant indicating a mapping configuration identifying time-frequency resources for a second repetition of a SIB transmission relative to a first repetition of the SIB transmission. The operations of 1605 may be performed in accordance with examples as disclosed herein. In some examples, aspects of the operations of 1605 may be performed by a grant manager 1225 as described with reference to FIG. 12.

At 1610, the method may include transmitting, in a first subset bandwidth of a system bandwidth, the first repetition of the SIB transmission according to the grant. The operations of 1610 may be performed in accordance with examples as disclosed herein. In some examples, aspects of the operations of 1610 may be performed by an SIB repetition manager 1230 as described with reference to FIG. 12.

At 1615, the method may include transmitting, in a second subset bandwidth of the system bandwidth, the second repetition of the SIB transmission according to the grant and based on the mapping configuration. The operations of 1615 may be performed in accordance with examples as disclosed herein. In some examples, aspects of the operations of 1615 may be performed by an SIB repetition manager 1230 as described with reference to FIG. 12.

Figure 17:
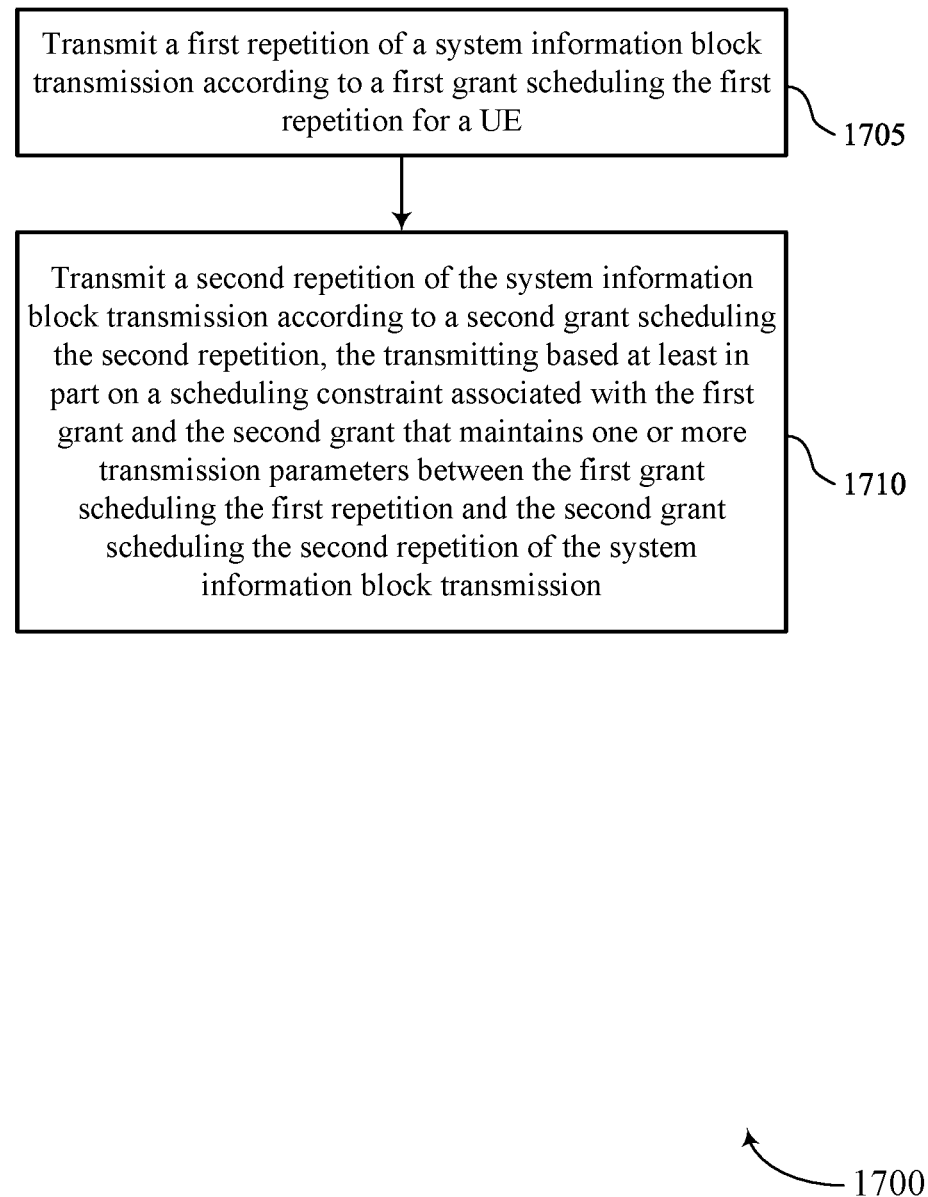

FIG. 17 shows a flowchart illustrating a method 1700 that supports system information transmission with coverage recovery in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a first repetition of a SIB transmission according to a first grant scheduling the first repetition for a UE. The operations of 1705 may be performed in accordance with examples as disclosed herein. In some examples, aspects of the operations of 1705 may be performed by an SIB repetition manager 1230 as described with reference to FIG. 12.

At 1710, the method may include transmitting a second repetition of the SIB transmission according to a second grant scheduling the second repetition, the transmitting based on a scheduling constraint associated with the first grant and the second grant that maintains one or more transmission parameters between the first grant scheduling the first repetition and the second grant scheduling the second repetition of the SIB transmission. The operations of 1710 may be performed in accordance with examples as disclosed herein. In some examples, aspects of the operations of 1710 may be performed by an SIB repetition manager 1230 as described with reference to FIG. 12.

The following provides an overview of aspects of the present disclosure:

Aspect 1: A method for wireless communication at a UE, comprising: receiving a grant scheduling repetition-based SIB transmissions for the UE, the grant indicating a mapping configuration identifying time-frequency resources for a second repetition of a SIB transmission relative to a first repetition of the SIB transmission; receiving, in a first subset bandwidth of a system bandwidth, the first repetition of the SIB transmission according to the grant; and receiving, in a second subset bandwidth of the system bandwidth, the second repetition of the SIB transmission according to the grant and based at least in part on the mapping configuration.

Aspect 2: The method of aspect 1, further comprising: selecting a set of time-frequency resources for the second repetition of the SIB transmission based at least in part on an interleaving mapping indicated in the grant, wherein the mapping configuration comprises the interleaving mapping.

Aspect 3: The method of aspect 2, further comprising: detecting, in the grant, a repetition flag set to a value indicating that the second repetition of the SIB transmission will occur; and selecting the set of time-frequency resources for the second repetition of the SIB transmission based at least in part on the repetition flag and a time domain resource allocation indicated in the grant.

Aspect 4: The method of any of aspects 2 through 3, further comprising: detecting, in the grant, a redundancy version set to a value indicating that the second repetition of the SIB transmission will occur; and selecting the set of time-frequency resources for the second repetition of the SIB transmission based at least in part on the redundancy version and a time domain resource allocation indicated in the grant.

Aspect 5: The method of any of aspects 2 through 4, wherein the set of time-frequency resources associated with the interleaving mapping comprises a cyclic shifting of the system bandwidth, cyclic shifting of one or more resource blocks, or a combination thereof.

Aspect 6: The method of any of aspects 1 through 5, further comprising: determining a synchronization signal block bandwidth based at least in part on the system bandwidth, wherein the first subset bandwidth and the second subset bandwidth are based at least in part on the synchronization signal block bandwidth.

Aspect 7: The method of any of aspects 1 through 6, further comprising: performing a retuning operation to retune from the first subset bandwidth to the second subset bandwidth between receiving the first repetition and the second repetition of the SIB transmission, wherein the second subset bandwidth comprises a different bandwidth relative to the first subset bandwidth.

Aspect 8: The method of any of aspects 1 through 7, further comprising: refraining from performing a retuning operation to retune from the first subset bandwidth to the second subset bandwidth between receiving the first repetition and the second repetition of the SIB transmission, wherein the second subset bandwidth comprises a same bandwidth relative to the first subset bandwidth.

Aspect 9: A method for wireless communication at a UE, comprising: receiving a first repetition of a SIB transmission according to a first grant scheduling the first repetition; and receiving a second repetition of the SIB transmission according to a second grant scheduling the second repetition, the receiving based at least in part on a scheduling constraint associated with the first grant and the second grant that maintains one or more transmission parameters between the first grant scheduling the first repetition and the second grant scheduling the second repetition of the SIB transmission.

Aspect 10: The method of aspect 9, further comprising: receiving the first repetition in a first subset bandwidth of a system bandwidth and receiving the second repetition in a second subset bandwidth of the system bandwidth, wherein the second subset bandwidth comprises a different bandwidth relative to the first subset bandwidth.

Aspect 11: The method of any of aspects 9 through 10, further comprising: receiving the first repetition in a first subset bandwidth of a system bandwidth and receiving the second repetition in a second subset bandwidth of the system bandwidth, wherein the second subset bandwidth comprises a same bandwidth relative to the first sub set bandwidth.

Aspect 12: The method of aspect 11, further comprising: selecting a set of time-frequency resources for the second repetition of the SIB transmission based at least in part on a redundancy version set to a value indicating that the second repetition of the SIB transmission will occur.

Aspect 13: The method of any of aspects 9 through 12, further comprising: detecting a flag in the first grant set to a value to indicate whether contents of the SIB transmission are shared between the first repetition and the second repetition.

Aspect 14: The method of any of aspects 9 through 13, wherein the scheduling constraint comprises a shared modulation and coding scheme, a shared frequency domain resource allocation, a shared interleaved interleaving mapping, a shared redundancy version, or a combination thereof.

Aspect 15: A method for wireless communication at a network entity, comprising: transmitting a grant scheduling repetition-based SIB transmissions for a UE, the grant indicating a mapping configuration identifying time-frequency resources for a second repetition of a SIB transmission relative to a first repetition of the SIB transmission; transmitting, in a first subset bandwidth of a system bandwidth, the first repetition of the SIB transmission according to the grant; and transmitting, in a second subset bandwidth of the system bandwidth, the second repetition of the SIB transmission according to the grant and based at least in part on the mapping configuration.

Aspect 16: The method of aspect 15, further comprising: selecting a set of time-frequency resources for the second repetition of the SIB transmission based at least in part on an interleaving mapping indicated in the grant, wherein the mapping configuration comprises the interleaving mapping.

Aspect 17: The method of aspect 16, further comprising: detecting, in the grant, a repetition flag set to a value indicating that the second repetition of the SIB transmission will occur; and selecting the set of time-frequency resources for the second repetition of the SIB transmission based at least in part on the repetition flag and a time domain resource allocation indicated in the grant.

Aspect 18: The method of any of aspects 16 through 17, further comprising: configuring, in the grant, a redundancy version set to a value indicating that the second repetition of the SIB transmission will occur; and selecting the set of time-frequency resources for the second repetition of the SIB transmission based at least in part on the redundancy version and a time domain resource allocation indicated in the grant.

Aspect 19: The method of any of aspects 16 through 18, wherein the set of time-frequency resources associated with the interleaving mapping comprises a cyclic shifting of the system bandwidth, cyclic shifting of one or more resource blocks, or a combination thereof.

Aspect 20: The method of any of aspects 15 through 19, further comprising: determining a synchronization signal block bandwidth based at least in part on the system bandwidth, wherein the first subset bandwidth and the second subset bandwidth are based at least in part on the synchronization signal block bandwidth.

Aspect 21: The method of any of aspects 15 through 20, further comprising: performing a retuning operation to retune from the first subset bandwidth to the second subset bandwidth between transmitting the first repetition and the second repetition of the SIB transmission, wherein the second subset bandwidth comprises a different bandwidth relative to the first subset bandwidth.

Aspect 22: The method of any of aspects 15 through 21, further comprising: refraining from performing a retuning operation to retune from the first subset bandwidth to the second subset bandwidth between transmitting the first repetition and the second repetition of the SIB transmission, wherein the second subset bandwidth comprises a same bandwidth relative to the first subset bandwidth.

Aspect 23: A method for wireless communication at a network entity, comprising: transmitting a first repetition of a SIB transmission according to a first grant scheduling the first repetition for a UE; and transmitting a second repetition of the SIB transmission according to a second grant scheduling the second repetition, the transmitting based at least in part on a scheduling constraint associated with the first grant and the second grant that maintains one or more transmission parameters between the first grant scheduling the first repetition and the second grant scheduling the second repetition of the SIB transmission.

Aspect 24: The method of aspect 23, further comprising: transmitting the first repetition in a first subset bandwidth of a system bandwidth and transmitting the second repetition in a second subset bandwidth of the system bandwidth, wherein the second subset bandwidth comprises a different bandwidth relative to the first subset bandwidth.

Aspect 25: The method of any of aspects 23 through 24, further comprising: transmitting the first repetition in a first subset bandwidth of a system bandwidth and transmitting the second repetition in a second subset bandwidth of the system bandwidth, wherein the second subset bandwidth comprises a same bandwidth relative to the first subset bandwidth.

Aspect 26: The method of aspect 25, further comprising: selecting a set of time-frequency resources for the second repetition of the SIB transmission based at least in part on a redundancy version set to a value indicating that the second repetition of the SIB transmission will occur.

Aspect 27: The method of any of aspects 23 through 26, further comprising: setting a flag in the first grant to a value to indicate whether contents of the SIB transmission are shared between the first repetition and the second repetition.

Aspect 28: The method of any of aspects 23 through 27, wherein the scheduling constraint comprises a shared modulation and coding scheme, a shared frequency domain resource allocation, a shared interleaving mapping, a shared redundancy version, or a combination thereof.

Aspect 29: An apparatus for wireless communication at a UE, comprising a processor; and memory coupled to the processor and configured to perform a method of any of aspects 1 through 8.

Aspect 30: An apparatus for wireless communication at a UE, comprising at least one means for performing a method of any of aspects 1 through 8.

Aspect 31: A non-transitory computer-readable medium storing code for wireless communication at a UE, the code comprising instructions executable by a processor to perform a method of any of aspects 1 through 8.

Aspect 32: An apparatus for wireless communication at a UE, comprising a processor; and memory coupled to the processor and configured to perform a method of any of aspects 9 through 14.

Aspect 33: An apparatus for wireless communication at a UE, comprising at least one means for performing a method of any of aspects 9 through 14.

Aspect 34: A non-transitory computer-readable medium storing code for wireless communication at a UE, the code comprising instructions executable by a processor to perform a method of any of aspects 9 through 14.

Aspect 35: An apparatus for wireless communication at a network entity, comprising a processor; and memory coupled to the processor and configured to perform a method of any of aspects 15 through 22.

Aspect 36: An apparatus for wireless communication at a network entity, comprising at least one means for performing a method of any of aspects 15 through 22.

Aspect 37: A non-transitory computer-readable medium storing code for wireless communication at a network entity, the code comprising instructions executable by a processor to perform a method of any of aspects 15 through 22.

Aspect 38: An apparatus for wireless communication at a network entity, comprising a processor; and memory coupled to the processor and configured to perform a method of any of aspects 23 through 28.

Aspect 39: An apparatus for wireless communication at a network entity, comprising at least one means for performing a method of any of aspects 23 through 28.

Aspect 40: A non-transitory computer-readable medium storing code for wireless communication at a network entity, the code comprising instructions executable by a processor to perform a method of any of aspects 23 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    a processor, and
    memory coupled to the processor and configured to:
        receive a grant scheduling repetition-based system information block transmissions for the UE, the grant indicating a mapping configuration identifying time-frequency resources for a second repetition of a system information block transmission relative to a first repetition of the system information block transmission;
        receive, in a first subset bandwidth of a system bandwidth, the first repetition of the system information block transmission according to the grant;
        receive, in a second subset bandwidth of the system bandwidth, the second repetition of the system information block transmission according to the grant and based at least in part on the mapping configuration; and
        select a set of time-frequency resources for the second repetition of the system information block transmission based at least in part on an interleaving mapping indicated in the grant, wherein the mapping configuration comprises the interleaving mapping.

2. The apparatus of claim 1, wherein the memory coupled to the processor is further configured to:
    detect, in the grant, a repetition flag set to a value indicating that the second repetition of the system information block transmission will occur; and
    select the set of time-frequency resources for the second repetition of the system information block transmission based at least in part on the repetition flag and a time domain resource allocation indicated in the grant.

3. The apparatus of claim 1, wherein the memory coupled to the processor is further configured to:
    detect, in the grant, a redundancy version set to a value indicating that the second repetition of the system information block transmission will occur; and
    select the set of time-frequency resources for the second repetition of the system information block transmission based at least in part on the redundancy version and a time domain resource allocation indicated in the grant.

4. The apparatus of claim 1, wherein the set of time-frequency resources associated with the interleaving mapping comprises a cyclic shifting of the system bandwidth, cyclic shifting of one or more resource blocks, or a combination thereof.

5. The apparatus of claim 1, wherein the memory coupled to the processor is further configured to:
    determine a synchronization signal block bandwidth based at least in part on the system bandwidth, wherein the first subset bandwidth and the second subset bandwidth are based at least in part on the synchronization signal block bandwidth.

6. The apparatus of claim 1, wherein the memory coupled to the processor is further configured to:
    perform a retuning operation to retune from the first subset bandwidth to the second subset bandwidth between receiving the first repetition and the second repetition of the system information block transmission, wherein the second subset bandwidth comprises a different bandwidth relative to the first subset bandwidth.

7. The apparatus of claim 1, wherein the memory coupled to the processor is further configured to:
    refrain from performing a retuning operation to retune from the first subset bandwidth to the second subset bandwidth between receiving the first repetition and the second repetition of the system information block transmission, wherein the second subset bandwidth comprises a same bandwidth relative to the first subset bandwidth.

8. An apparatus for wireless communication at a user equipment (UE), comprising:
    a processor; and
    memory coupled to the processor and configured to:
        receive a first repetition of a system information block transmission according to a first grant scheduling the first repetition;
        receive a second repetition of the system information block transmission according to a second grant scheduling the second repetition, the receiving based at least in part on a scheduling constraint associated with the first grant and the second grant that maintains one or more transmission parameters between the first grant scheduling the first repetition and the second grant scheduling the second repetition of the system information block transmission; and detect a flag in the first grant set to a value to indicate whether contents of the system information block transmission are shared between the first repetition and the second repetition.

9. The apparatus of claim 8, wherein the memory coupled to the processor is further configured to:
receive the first repetition in a first subset bandwidth of a system bandwidth and receiving the second repetition in a second subset bandwidth of the system bandwidth, wherein the second subset bandwidth comprises a different bandwidth relative to the first subset bandwidth.

10. The apparatus of claim 8, wherein the memory coupled to the processor is further configured to:
receive the first repetition in a first subset bandwidth of a system bandwidth and receiving the second repetition in a second subset bandwidth of the system bandwidth, wherein the second subset bandwidth comprises a same bandwidth relative to the first subset bandwidth.

11. The apparatus of claim 10, wherein the memory coupled to the processor is further configured to:
select a set of time-frequency resources for the second repetition of the system information block transmission based at least in part on a redundancy version set to a value indicating that the second repetition of the system information block transmission will occur.

12. The apparatus of claim 8, wherein the scheduling constraint comprises a shared modulation and coding scheme, a shared frequency domain resource allocation, a shared interleaved interleaving mapping, a shared redundancy version, or a combination thereof.

13. An apparatus for wireless communication at a network entity, comprising:
a processor; and
memory coupled to the processor and configured to:
transmit a grant scheduling repetition-based system information block transmissions for a user equipment (UE), the grant indicating a mapping configuration identifying time-frequency resources for a second repetition of a system information block transmission relative to a first repetition of the system information block transmission;
transmit, in a first subset bandwidth of a system bandwidth, the first repetition of the system information block transmission according to the grant;
transmit, in a second subset bandwidth of the system bandwidth, the second repetition of the system information block transmission according to the grant and based at least in part on the mapping configuration; and
select a set of time-frequency resources for the second repetition of the system information block transmission based at least in part on an interleaving mapping indicated in the grant, wherein the mapping configuration comprises the interleaving mapping.

14. The apparatus of claim 13, wherein the memory coupled to the processor is further configured to:
detect, in the grant, a repetition flag set to a value indicating that the second repetition of the system information block transmission will occur; and
select the set of time-frequency resources for the second repetition of the system information block transmission based at least in part on the repetition flag and a time domain resource allocation indicated in the grant.

15. The apparatus of claim 13, wherein the memory coupled to the processor is further configured to:

configure, in the grant, a redundancy version set to a value indicating that the second repetition of the system information block transmission will occur; and
select the set of time-frequency resources for the second repetition of the system information block transmission based at least in part on the redundancy version and a time domain resource allocation indicated in the grant.

16. The apparatus of claim 13, wherein the set of time-frequency resources associated with the interleaving mapping comprises a cyclic shifting of the system bandwidth, cyclic shifting of one or more resource blocks, or a combination thereof.

17. The apparatus of claim 13, wherein the memory coupled to the processor is further configured to:
determine a synchronization signal block bandwidth based at least in part on the system bandwidth, wherein the first subset bandwidth and the second subset bandwidth are based at least in part on the synchronization signal block bandwidth.

18. The apparatus of claim 13, wherein the instructions are further executable by the processor to cause the apparatus to:
perform a retuning operation to retune from the first subset bandwidth to the second subset bandwidth between transmitting the first repetition and the second repetition of the system information block transmission, wherein the second subset bandwidth comprises a different bandwidth relative to the first subset bandwidth.

19. The apparatus of claim 13, wherein the memory coupled to the processor is further configured to:
refrain from performing a retuning operation to retune from the first subset bandwidth to the second subset bandwidth between transmitting the first repetition and the second repetition of the system information block transmission, wherein the second subset bandwidth comprises a same bandwidth relative to the first subset bandwidth.

20. An apparatus for wireless communication at a network entity, comprising:
a processor; and
memory coupled to the processor and configured to:
transmit a first repetition of a system information block transmission according to a first grant scheduling the first repetition for a user equipment (UE);
transmit a second repetition of the system information block transmission according to a second grant scheduling the second repetition, the transmitting based at least in part on a scheduling constraint associated with the first grant and the second grant that maintains one or more transmission parameters between the first grant scheduling the first repetition and the second grant scheduling the second repetition of the system information block transmission; and
set a flag in the first grant to a value to indicate whether contents of the system information block transmission are shared between the first repetition and the second repetition.

21. The apparatus of claim 20, wherein the memory coupled to the processor is further configured to:
transmit the first repetition in a first subset bandwidth of a system bandwidth and transmitting the second repetition in a second subset bandwidth of the system bandwidth, wherein the second subset bandwidth comprises a different bandwidth relative to the first subset bandwidth.

22. The apparatus of claim 20, wherein the memory coupled to the processor is further configured to:
transmit the first repetition in a first subset bandwidth of a system bandwidth and transmitting the second repetition in a second subset bandwidth of the system bandwidth, wherein the second subset bandwidth comprises a same bandwidth relative to the first subset bandwidth.

23. The apparatus of claim 22, wherein the memory coupled to the processor is further configured to:
select a set of time-frequency resources for the second repetition of the system information block transmission based at least in part on a redundancy version set to a value indicating that the second repetition of the system information block transmission will occur.

24. The apparatus of claim 20, wherein the scheduling constraint comprises a shared modulation and coding scheme, a shared frequency domain resource allocation, a shared interleaving mapping, a shared redundancy version, or a combination thereof.

* * * * *